United States Patent
Nagai et al.

(10) Patent No.: US 9,225,008 B2
(45) Date of Patent: Dec. 29, 2015

(54) SECONDARY BATTERY

(75) Inventors: Hiroki Nagai, Nagoya (JP); Masahiro Morita, Toyota (JP); Takashi Iwao, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 310 days.

(21) Appl. No.: 13/879,132

(22) PCT Filed: Oct. 15, 2010

(86) PCT No.: PCT/JP2010/068211
§ 371 (c)(1),
(2), (4) Date: Apr. 12, 2013

(87) PCT Pub. No.: WO2012/049778
PCT Pub. Date: Apr. 19, 2012

(65) Prior Publication Data
US 2013/0224586 A1    Aug. 29, 2013

(51) Int. Cl.
*H01M 4/131* (2010.01)
*H01M 10/00* (2006.01)
(Continued)

(52) U.S. Cl.
CPC ............ *H01M 4/131* (2013.01); *H01M 4/1391* (2013.01); *H01M 4/505* (2013.01); *H01M 4/525* (2013.01); *H01M 10/00* (2013.01);
(Continued)

(58) Field of Classification Search
CPC ........... H01M 4/58; H01M 4/02; H01M 4/62; H01M 4/12
USPC ......... 429/312, 102, 211, 231.95, 223, 231.3; 423/594.3, 594.4
See application file for complete search history.

(56) References Cited

U.S. PATENT DOCUMENTS 5,677,082 A * 10/1997 Greinke et al. ............... 429/312
2001/0031391 A1  10/2001 Hironaka et al.
(Continued)

FOREIGN PATENT DOCUMENTS

CN     101414675     4/2009
JP     2000-340226   12/2000
(Continued)

OTHER PUBLICATIONS

English Translation of JP2000-348537 (Dec. 2000).*
(Continued)

*Primary Examiner* — Patrick Ryan
*Assistant Examiner* — Kiran Quraishi
(74) *Attorney, Agent, or Firm* — Finnegan, Henderson, Farabow, Garrett & Dunner, LLP

(57) ABSTRACT

A porosity X of a positive electrode mixture layer 223 of a secondary battery 100 is 30(%)≤X. A mass ratio α of a positive electrode active material 610 in the positive electrode mixture layer 223 is 0.84≤α≤0.925 and a mass ratio β of a conductive material 620 in the positive electrode mixture layer 223 is 0.06≤β≤0.12. In the secondary battery 100, an index Y worked out from an expression below is 30 (mL/100 g)≤Y≤89 (mL/100 g). The index Y is given by the expression below, Y=A×α+B×β; where A is a DBP absorption number (mL/100 g) in the positive electrode active material 610; α is the mass ratio of the positive electrode active material 610 in the positive electrode mixture layer 223; B is a DBP absorption number (mL/100 g) of the conductive material 620; and β is the mass ratio of the conductive material 620 in the positive electrode mixture layer 223.

19 Claims, 11 Drawing Sheets

(51) Int. Cl.
  *H01M 4/1391* (2010.01)
  *H01M 4/505* (2010.01)
  *H01M 4/525* (2010.01)
  *H01M 4/02* (2006.01)

(52) U.S. Cl.
  CPC ..... *H01M2004/021* (2013.01); *H01M 2220/20* (2013.01); *Y02E 60/122* (2013.01); *Y10T 29/49108* (2015.01)

(56) References Cited

U.S. PATENT DOCUMENTS

| | | | |
|---|---|---|---|
| 2005/0221182 A1* | 10/2005 | Fujiwara et al. | 429/231.1 |
| 2006/0134521 A1* | 6/2006 | Shima | 429/231.1 |
| 2009/0104517 A1 | 4/2009 | Yuasa et al. | |
| 2010/0068624 A1 | 3/2010 | Hiratsuka et al. | |

FOREIGN PATENT DOCUMENTS

| | | | | |
|---|---|---|---|---|
| JP | 2000-348537 | * | 12/2000 | ............. H01M 4/62 |
| JP | 2001-222995 | | 8/2001 | |
| JP | 2005-44722 | | 2/2005 | |
| JP | 2005-044722 | * | 2/2005 | ............. H01M 4/58 |
| JP | 2005-85729 | | 3/2005 | |
| JP | 2005-285606 | | 10/2005 | |
| JP | 2007-184261 | | 7/2007 | |
| JP | 2008-174444 | | 7/2008 | |
| JP | 2009-48876 | | 3/2009 | |
| JP | 2009-99418 | | 5/2009 | |
| JP | 2009-193805 | | 8/2009 | |

OTHER PUBLICATIONS

English Translation of JP 2005-044722 (Feb. 2005).*

* cited by examiner

SECONDARY BATTERY

CROSS-REFERENCE TO RELATED APPLICATIONS

This application is a national phase application of International Application No. PCT/JP2010/068211, filed Oct. 15, 2010, the content of which is incorporated herein by reference.

TECHNICAL FIELD

The present invention relates to a secondary battery. The term "secondary battery" in the present description denotes a storage device in general that can be charged repeatedly, and encompasses so-called storage batteries such as lithium-ion secondary batteries, nickel hydride batteries, and nickel-cadmium batteries, as well as storage elements such as electric double-layer capacitors.

In the present description, the term "lithium-ion secondary battery" encompasses secondary batteries that utilize lithium ions as electrolyte ions and in which charge and discharge are realized through migration of charge mediated by lithium ions between a positive electrode and a negative electrode.

BACKGROUND ART

The positive and negative electrodes of lithium-ion secondary batteries are provided with a material (active material) that is capable of reversibly storing and releasing lithium ions (Li ions). Charging and discharging are elicited through traffic of lithium ions between the positive and negative electrodes. Such lithium-ion secondary batteries afford, in particular, high energy densities at a low weight. For this reason, these batteries hold potential as secondary batteries that are suitable for high-output power sources installed in vehicles. Lithium ion secondary batteries have been gaining importance, in that they can be used not only as power sources installed in vehicles, but also as small power sources, for instance in computers and mobile terminals, and as large power sources such as storage batteries for residential use.

Representative examples of active materials that are used in the electrodes (typically, the positive electrode) of lithium-ion secondary batteries include, for instance, complex oxides that comprise lithium and a transition metal element. As the abovementioned transition metal element, there is preferably used, for instance, a lithium complex oxide (nickel-containing lithium complex oxide) comprising at least nickel (Ni) and having a layered structure. Patent Literature 1 to 5 disclose technologies relating to active materials of lithium-ion secondary batteries.

Patent Literature 1 discloses the feature of using, as a positive electrode active material, a powder of a lithium-containing complex oxide having a DBP absorption number ranging from 20 mL to 40 mL per 100 g.

Patent Literature 2 discloses a lithium-ion secondary battery having a positive electrode mixture layer that comprises a positive electrode active material and a conducting agent. The conducting agent in the lithium-ion secondary battery disclosed in Patent Literature 2 takes up 7 mass % to 13 mass % of the positive electrode mixture layer. The porosity of the positive electrode mixture layer ranges from 35% to 55%. The concentration of a lithium salt in a nonaqueous electrolyte solution ranges from 102 mol/L to 2 mol/L. Patent Literature 2 indicates that, as a result, it becomes possible to suppress voltage drops even during discharge at high load. Further, Patent Literature 2 indicates that it is possible to provide a lithium-ion secondary battery having excellent output characteristic.

Patent Literature 3 discloses a method for producing a paste for a nonaqueous electrolyte secondary battery positive electrode plate. In the disclosed method for producing a paste for positive electrode plates of nonaqueous electrolyte secondary batteries, the mass ratio of conducting agent for the positive electrode ranges from 1.0 part by weight to 5.0 parts by weight with respect to 100 parts by weight of positive electrode active material, during production of the paste. Patent Literature 3 discloses a feature wherein a mixed powder resulting from combining the positive electrode active material and a conducting agent at a predetermined material input ratio, during production of the paste, exhibits a DBP (dibutyl phthalate) absorption number ranging from 15 mL/100 g to 40 mL/100 g (herein, "mL/100 g" denotes the absorption amount of DBP per 100 g of powder) as measured in accordance with method A prescribed in JIS K6217-4 "Test method of carbon black for rubber, fundamental properties".

Patent Literature 4 discloses a lithium-ion secondary battery wherein the porosity of a positive electrode mixture ranges from 21% to 31%.

Patent Literature 5 discloses a feature wherein the density of a positive electrode mixture layer is 3.5 g/cm$^3$ or higher and the porosity 25% or lower.

CITATION LIST

Patent Literature

Patent Literature 1: Japanese Patent Application Publication No. 2005-285606
Patent Literature 2: Japanese Patent Application Publication No. 2007-184261
Patent Literature 3: Japanese Patent Application Publication No. 2009-193805
Patent Literature 4: Japanese Patent Application Publication No. 2001-222995
Patent Literature 5: Japanese Patent Application Publication No. 2009-048876

SUMMARY OF INVENTION

In some applications, secondary batteries are used by being repeatedly discharged at a high rate (fast discharge) in the course of the use of the secondary battery. Representative examples of such applications include, for instance, power sources in hybrid cars and electric automobiles. Such applications demand, for instance, low resistance for discharge at a high rate, and preservation of battery performance for cycles of charge and discharge at a high rate (charge and discharge cycles). Therefore, the invention proposes a novel secondary battery that allows enhancing these features of battery performance.

The secondary battery according to the present invention comprises a positive electrode in which a collector is coated with a positive electrode mixture layer. The positive electrode mixture layer contains a positive electrode active material, a conductive material and a binder. A porosity X of the positive electrode mixture layer is 30(%)≤X. A mass ratio α of the positive electrode active material in the positive electrode mixture layer is 0.84≤α≤0.925, and a mass ratio β of the conductive material in the positive electrode mixture layer is 0.064≤β≤0.12. An index Y worked out from the expression below is 30 (mL/100 g)≤Y≤89 (mL/100 g):

$$Y = A \times \alpha + B \times \beta,$$

wherein A is a DBP absorption number (mL/100 g) of the positive electrode active material, α is the mass ratio of the positive electrode active material in the positive electrode mixture layer, B is a DBP absorption number (mL/100 g) of the conductive material, and β is the mass ratio of the conductive material in the positive electrode mixture layer.

In such a secondary battery, the porosity X of the positive electrode mixture layer is 30(%)≤X, and there is a given amount, or greater, of voids (open voids) into which an electrolyte solution can penetrate. The index Y worked out on the basis of the above expression denotes the ease with which the electrolyte solution that impregnates the positive electrode mixture layer can be absorbed by the positive electrode active material and the conductive material. In the secondary battery, both the positive electrode active material and the conductive material of the positive electrode mixture layer have a required DBP absorption number. The secondary battery is provided with a required positive electrode active material and a required conductive material per unit weight of the positive electrode mixture layer. As a result, there is afforded a secondary battery having an excellent high rate characteristic and in which resistance increases derived from charge and discharge cycles are kept low. The structure of the positive electrode active material is not particularly limited.

In this case, the positive electrode active material may have secondary particles resulting from aggregation of a plurality of primary particles of a lithium-transition metal oxide, and hollow sections respectively formed in the secondary particles. In this case, the positive electrode active material may further have through-holes that run through the secondary particles so as to link the hollow sections with an exterior. In the case of a structure having such through-holes, an opening width of the through-holes may be 0.01 μm or larger in average. The opening width of the through-holes may be 2.0 μm or smaller in average. The number of the through-holes may range, in average, from 1 to 20 per particle of the active material particles.

A method for producing such positive electrode active material may comprise, for instance, a starting material hydroxide generation step, a mixing step and a firing step.

The starting material hydroxide generation step is a step of supplying ammonium ions to an aqueous solution of a transition metal compound, to cause particles of the transition metal hydroxide to precipitate from the aqueous solution. The aqueous solution may comprise at least one transition metal element that makes up the lithium-transition metal oxide. The starting material hydroxide generation step may comprise a nucleation stage in which the transition metal hydroxide is caused to precipitate from the aqueous solution at pH 12 or higher and at an ammonium ion concentration of 25 g/L or lower, and a particle growth stage in which the precipitated transition metal hydroxide is caused to grow at pH lower than 12 and at an ammonium ion concentration of 3 g/L or higher. The mixing step is a step of preparing an unfired mixture by mixing particles of the transition metal hydroxide, obtained in the starting material hydroxide generation step, with a lithium compound. The firing step is a step of obtaining the active material particles by firing the mixture, obtained in the mixing step.

In this case, the highest firing temperature in the firing step may range from 800° C. to 1100° C. The firing step may include a first firing stage of firing the mixture at a temperature T1 ranging from 700° C. to 900° C., and a second firing stage of firing a resulting product having undergone the first firing stage, at a temperature T2 that ranges from 800° C. to 1100° C. and is higher than the firing temperature T1 in the first firing stage.

Herein, a BET specific surface area of the positive electrode active material may range from 0.5 to 1.9 $m^2/g$. An average hardness of the positive electrode active material may be 0.5 MPa or higher in a dynamic hardness measurement performed under conditions of a loading rate ranging from 0.5 mN/s to 3 mN/s using a flat diamond indenter having a diameter of 50 μm.

The positive electrode active material may have an average particle size ranging from 3 μm to 10 μm. The positive electrode active material may be a lithium-transition metal oxide of layered structure including nickel as a constituent element. The positive electrode active material may be a lithium-transition metal oxide of layered structure including nickel, cobalt and manganese as constituent elements.

DESCRIPTION OF EMBODIMENTS

Figure 1:
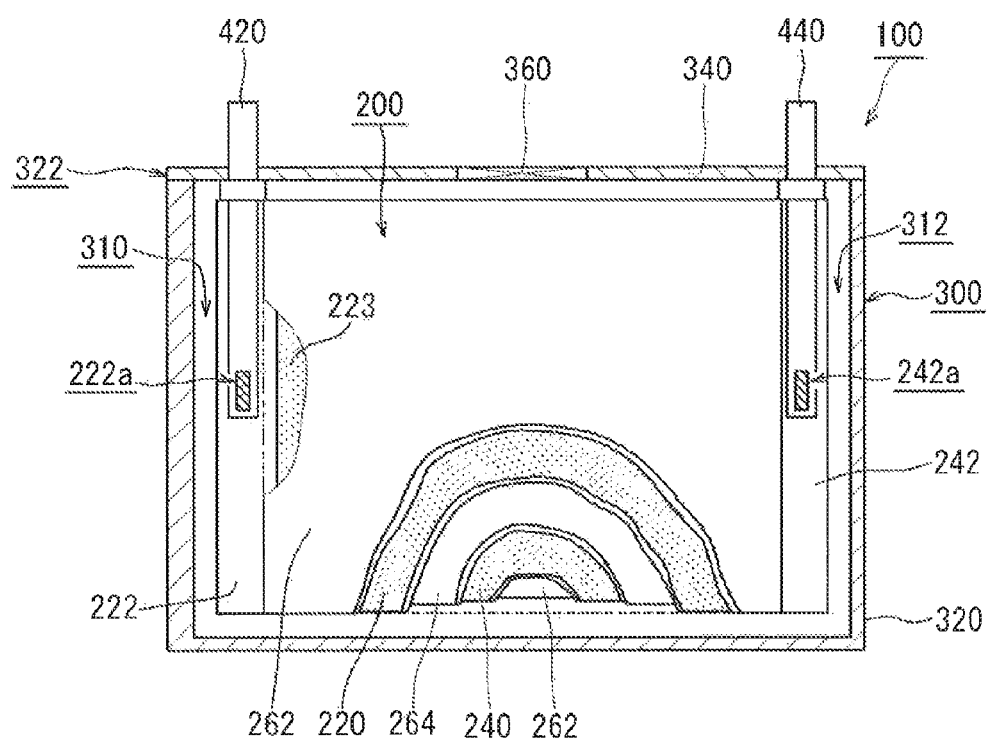
FIG. 1 is a diagram illustrating one example of a structure of a lithium-ion secondary battery.

A secondary battery according to an embodiment of the present invention will be explained next with reference to accompanying drawings. Members and sites that elicit the same effect and will be denoted by the same reference numerals, as appropriate. The drawings are schematic diagrams and do not necessarily reflect original objects. An example of a structure of a lithium-ion secondary battery will be explained first as one example of the secondary battery of the present invention; a positive electrode mix layer of the lithium-ion secondary battery will be explained next, followed by an explanation of an evaluation test of the lithium-ion secondary battery.

Figure 2:
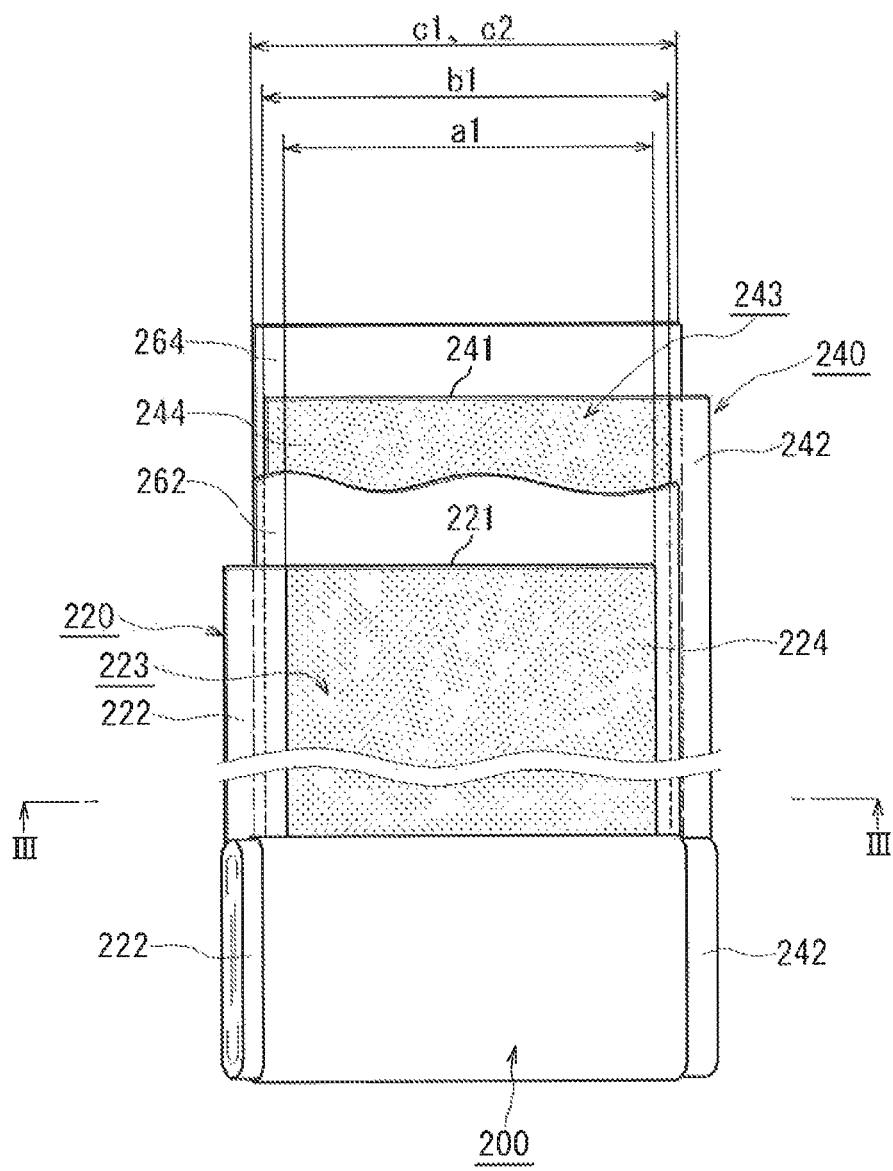
FIG. 2 is a diagram illustrating a wound electrode body of a lithium-ion secondary battery.
Figure 3:
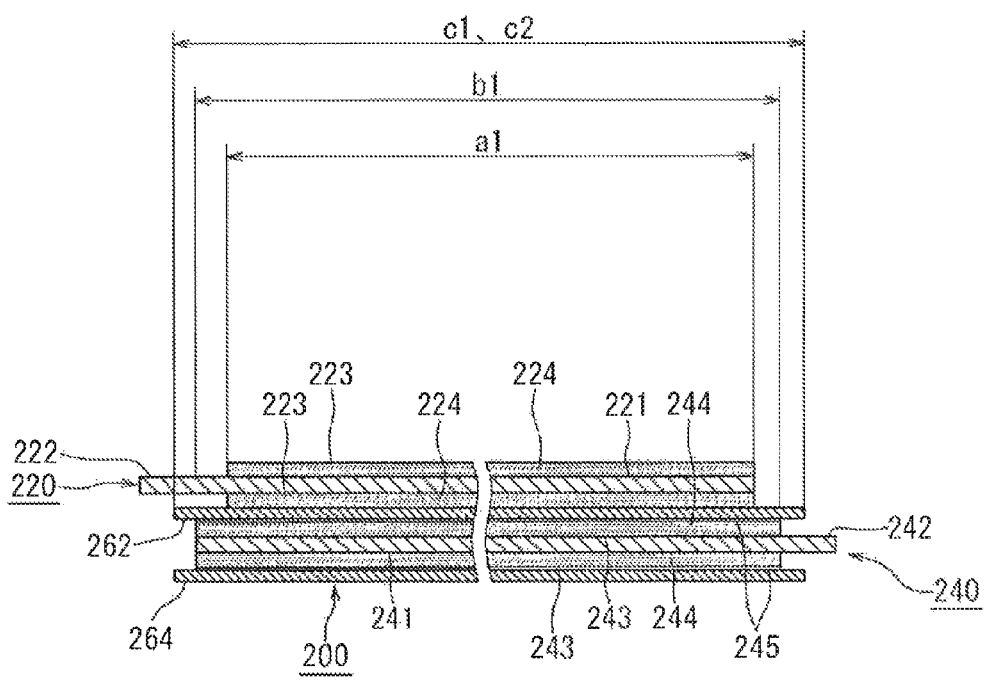
FIG. 3 is a diagram illustrating a III-III cross-section of FIG. 2.

FIG. 1 illustrates a lithium-ion secondary battery 100. As illustrated in FIG. 1, the lithium-ion secondary battery 100 comprises a wound electrode body 200 and a battery case 300. FIG. 2 illustrates a wound electrode body 200. FIG. 3 illustrates a cross-section III-III of FIG. 2.

As illustrated in FIG. 2, the wound electrode body 200 has a positive electrode sheet 220, a negative electrode sheet 240, and separators 262, 264. The positive electrode sheet 220, the negative electrode sheet 240 and the separators 262, 264 are strip-like sheet materials.

<Positive Electrode Sheet 220>

As illustrated in FIG. 2, the positive electrode sheet 220 has a strip-like positive electrode collector 221 (positive electrode core material). A metal foil appropriate for positive electrodes can be suitably used for the positive electrode collector 221. A strip-like aluminum foil having a predetermined width is used in the positive electrode collector 221. The positive electrode sheet 220 has an uncoated section 222 and a positive electrode mixture layer 223. The uncoated section 222 is set along the edge section, on one side in the width direction, of the positive electrode collector 221. The positive electrode mixture layer 223 is a layer obtained through application of a positive electrode mixture 224 that comprises a positive electrode active material. The positive electrode mixture 224 is applied onto both faces of the positive electrode collector 221, except at the uncoated section 222 that is set in the positive electrode collector 221.

<Positive Electrode Mixture 224, Positive Electrode Active Material>

The positive electrode mixture 224 is a mixture obtained by mixing a positive electrode active material, a conductive material, a binder, a thickener and so forth in a solvent. Substances that are used as positive electrode active materials of lithium-ion secondary batteries can be used as the abovementioned positive electrode active material. Examples of positive electrode active materials include, for instance, lithium-transition metal oxides such as $LiNiCoMnO_2$ (lithium-nickel-cobalt-manganese complex oxide), $LiNiO_2$ (lithium nickelate), $LiCoO_2$ (lithium cobaltate), $LiMn_2O_4$ (lithium manganate), $LiFePO_4$ (lithium iron phosphate). Herein, $LiMn_2O_4$ has for instance a spinel structure, and $LiNiO_2$ and $LiCoO_2$ have a layered rock-salt structure, while $LiFeFO_4$ has for instance an olivine structure. Olivine-structure $LiFePO_4$ takes, for instance, the form of nanometer-scale particles. Olivine-structure $LiFePO_4$ can be covered with a carbon film.

Conductive Material>

Examples of the conductive material include, for instance, carbon materials such as carbon powder and carbon fibers. The conductive material that is used may be a single type, or two or more types used concomitantly, selected from among such conductive materials. As the carbon powder there can be used, for instance, various types of carbon black (for instance, acetylene black, oil furnace black, graphitized carbon black, carbon black, graphite, Ketjen black), graphite powder or the like.

<Binder, Thickener and Solvent>

As the binder there can be used a polymer that can be dissolved or dispersed in the solvent that is used. In a positive electrode mixture composition that uses an aqueous solvent there can be preferably used, for instance, a water-soluble or water-dispersible polymer, for instance a cellulosic polymer such as carboxymethyl cellulose (CMC), hydroxypropyl methyl cellulose (HPMC) or the like, for instance, polyvinyl alcohol (PVA) or a fluororesin such as polytetrafluoroethylene (PTFE) or the like or a tetrafluoroethylene-hexylluoropropylene copolymer (FEP), for instance, a vinyl acetate copolymer, or a rubber such as an acrylic modified SBR resin (SBR latex), for instance styrene-butadiene rubber (SBR) or the like). In a positive electrode mixture composition that utilizes a nonaqueous solvent there can be used, preferably, a polymer such as polyvinylidene fluoride (PVDF), polyvinyl chloride (PVDC) or the like. The polymer materials exemplified above can be used for the purpose of functioning as a binder, and, additionally, as another additive, for instance a thickener, in the abovementioned composition. An aqueous solvent or a nonaqueous solvent can be used as the solvent. Suitable examples of the nonaqueous solvent include, for instance, N-methyl-2-pyrrolidone (NMP).

The mass proportion of the positive electrode active material in the total positive electrode mixture is preferably about 50 mass % or greater (typically, 50 to 95 mass %), and more preferably, in ordinary instances, from about 70 to 95 mass % (for instance 75 to 90 mass %). The proportion of conductive material in the total positive electrode mixture can be set, for instance, to about 2 to 20 mass %, and preferably, in ordinary instances, to about 2 to 15 mass %. In compositions where a binder is used, the proportion of binder in the total positive electrode mixture can be set, for instance, to about 1 to 10 mass %, and preferably, in ordinary instances, to about 2 to 5 mass %.

<Negative Electrode Sheet 240>

As illustrated in FIG. 2, the negative electrode sheet 240 has a strip-like negative electrode collector 241 (negative electrode core material). A metal foil appropriate for negative electrodes is suitably used for the negative electrode collector 241. In the present embodiment, a strip-like copper foil having a predetermined width is used in the negative electrode collector 241. The negative electrode sheet 240 has an uncoated section 242 and a negative electrode mixture layer 243. The uncoated section 242 is set along the edge section, on one side in the width direction, of the negative electrode collector 241. The negative electrode mixture layer 243 is a layer obtained through application of a negative electrode mixture 244 that comprises a negative electrode active material. The negative electrode mixture 244 is applied onto both faces of the negative electrode collector 241, except at the uncoated section 242 that is set in the negative electrode collector 241.

<Negative Electrode Sheet 244>

The negative electrode mixture 244 is a mixture obtained by mixing a negative electrode active material, a thickener, a binder and so forth. Substances that are used as negative electrode active materials of lithium-ion secondary batteries can be used as the abovementioned negative electrode active material. Examples of the negative electrode active material include, for instance, carbon-based materials such as natural graphite, artificial graphite, or amorphous carbon from natural graphite or artificial graphite, as well as lithium-transition metal oxides, lithium-transition metal nitrides and the like. The negative electrode active material itself has conductivity. As a result, a conductive material is added to the negative electrode mixture 244 as the case may require. In the present example, a heat-resistant layer (HRL) 245 is further formed on the surface of the negative electrode mixture layer 243, as illustrated in FIG. 3. The heat-resistant layer 245 is mainly formed of a metal oxide (for instance, alumina). In the lithium-ion secondary battery 100, the heat-resistant layer 245 is formed on the surface of the negative electrode mixture layer 243. Although not shown in the figures, the heat-resistant layer may be formed, for instance, on the surface of the separators 262, 264.

<Negative Electrode Active Material>

The negative electrode active material is not particularly limited, and there can be used one, two or more types of materials conventionally used in lithium-ion secondary batteries. Examples thereof include, for instance, a particulate carbon material (carbon particles) that comprise, at least partially, a graphite structure (layered structure). More specifically, there can be used a carbon material in the form of for instance, a so-called graphitic substance (graphite), an easily graphitizable carbonaceous substance (hard carbon), an easily graphitizable carbonaceous substance (soft carbon), and combinations of the foregoing. For instance, there can be used graphite particles such as those of natural graphite. A suitable amount of thickener is mixed into the negative electrode mixture in order to preserve the dispersion of the negative electrode active material. The same thickener, binder and conductive material that are used in the positive electrode mixture can be utilized in the negative electrode mixture.

Although not particularly limited thereto, the proportion of the negative electrode active material in the total negative electrode mixture can be set to about 80 mass % or higher (for instance, from 80 to 99 mass %). The proportion of the negative electrode active material in the total negative electrode mixture is preferably about 90 mass % or higher (for instance, 90 to 99 mass %, more preferably 95 to 99 mass %). In a composition where a binder is used, the proportion of the binder in the total negative electrode mixture can be set, for instance, to about 0.5 to 10 mass %, and preferably, in ordinary instances, to about 1 to 5 mass %. The positive electrode mixture layer 223 and the negative electrode mixture layer 243 are formed through coating of the positive electrode collector 221 and the negative electrode collector 241, followed by drying and rolling.

<Mix Application>

In an application step, the positive electrode mixture 224 and the negative electrode mixture 244 are applied onto the sheet-like collectors (221, 241). In the application step there can be used a conventionally known appropriate application device, for instance a slit coater, a die coater, a comma coater, a gravure coater or the like. Using an elongate strip-like sheet-like collector allows herein applying continuously the positive electrode mixture 224 and the negative electrode mixture 244 onto the collectors.

<Drying Step>

The positive electrode mixture 224 and the negative electrode mixture 244 that are applied onto the sheet-like collector are dried in the drying step. Appropriate drying conditions may be set in order to prevent migration. Herein, the positive electrode mixture 224 and the negative electrode mixture 244 that are applied on the collector can be dried continuously by using an elongate strip-like sheet-like collector and by causing the collector to run along a travel pathway provided in a drying oven.

<Rolling Step>

In the rolling step, the positive electrode mixture layer 223 and the negative electrode mixture layer 243 that have been dried in the drying step are pressed in the thickness direction, to yield thereby a sheet-like positive electrode (positive electrode sheet) having the intended properties. A conventionally known method, such as a roll press method, a plate press method or the like can be appropriately used as the pressing method.

<Separators 262, 264>

The separators 262, 264 are members that separate the positive electrode sheet 220 and the negative electrode sheet 240. In the present example, the separators 262, 264 are formed out of strip-like sheet materials of predetermined width and having a plurality of small holes. The separators 262, 264 include, for instance, separators of single-layer structure or multilayer structure, made of a porous polyolefin resin. In the present example, the width b1 of the negative electrode mixture layer 243 is slightly wider than the width a1 of the positive electrode mixture layer 223, as illustrated in FIG. 2 and FIG. 3. The widths c1 and c2 of the separators 262, 264 are slightly wider than the width b1 of the negative electrode mixture layer 243 (c1, c2>b1>a1).

<Wound Electrode Body 200>

The positive electrode sheet 220 and the negative electrode sheet 240 of the wound electrode body 200 are stacked, with the separators 262, 264 interposed in between, and are then wound.

In the present example, the positive electrode sheet 220, the negative electrode sheet 240 and the separators 262, 264 are aligned in the length direction and are stacked in the order positive electrode sheet 220, separator 262, negative electrode sheet 240 and separator 264, as illustrated in FIG. 2. The separators 262, 264 are stacked on the positive electrode mixture layer 223 and the negative electrode mixture layer 243. The width of the negative electrode mixture layer 243 is slightly wider than that of the positive electrode mixture layer 223, the negative electrode mixture layer 243 being stacked so as to cover the positive electrode mixture layer 223. As a result, lithium ions (Li) can move back and forth more reliably between the positive electrode mixture layer 223 and the negative electrode mixture layer 243 during charge and discharge.

Further, the uncoated section 222 of the positive electrode sheet 220 and the uncoated section 242 of the negative electrode sheet 240 are stacked so as to jut out of mutually opposing sides in the width direction. The stacked sheet materials (for instance, the positive electrode sheet 220) are wound about a winding axis that is set in the width direction.

The wound electrode body 200 is wound with the positive electrode sheet 220, the negative electrode sheet 240 and the separators 262, 264 stacked in a predetermined order. In this step, the sheets are stacked while the position of the various sheets is controlled using a position adjustment mechanism such as EPC (edge position control). The negative electrode mixture layer 243 is stacked so as to cover the positive electrode mixture layer 223, with the separators 262, 264 interposed in between.

<Battery Case 300>

In the present example, the battery case 300 is a so-called square battery case, provided with a container main body 320 and a lid body 340, as illustrated in FIG. 1. The container main body 320 is a flat box-like container shaped as a bottomed square cylinder, one side face (top face) of which is open. The lid body 340 is a member that is attached to the opening (top face opening) of the container main body 320, to plug the opening thereby.

Enhancing the weight energy efficiency (battery capacity per unit weight) of secondary batteries installed in vehicles is desirable in terms of improving fuel economy. To this end, the container main body 320 and the lid body 340 that make up the battery case 300 are preferably made of a lightweight metal such as aluminum or an aluminum alloy (aluminum, in the present example). This allows enhancing the weight energy efficiency.

The battery case 300 has a flat rectangular inner space as the space where the wound electrode body 200 is accommodated. As illustrated in FIG. 1, the flat inner space of the battery case 300 is slightly wider horizontally than the wound electrode body 200. In the present embodiment, the wound electrode body 200 is accommodated in the inner space of the battery case 300. As illustrated in FIG. 1, the wound electrode body 200 is accommodated in the battery case 300 in a state where the wound electrode body 200 is flatly deformed in a direction that is perpendicular to the winding axis.

In the present embodiment, the battery case 300 is provided with the container main body 320 shaped as a bottomed square cylinder, and the lid body 340 that plugs the opening of the container main body 320. The container main body 320 can be molded, for instance, by deep drawing or impact forming. Impact forming is a type of cold forging that is also referred to as impact extrusion or impact pressing.

Electrode terminals 420, 440 are provided in the lid body 340 of the battery case 300. The electrode terminals 420, 440 run through the battery case 300 (lid body 340) and jut out of the battery case 300. A safety valve 360 is provided in the lid body 340.

In the present example, the wound electrode body 200 is attached to the electrode terminals 420, 440 that are in turn attached to the battery case 300 (in the present example, the lid body 340). The wound electrode body 200 is accommodated in the battery case 300 with the wound electrode body 200 being pressed and bent flat in a direction perpendicular to the winding axis. In the wound electrode body 200, the uncoated section 222 of the positive electrode sheet 220 and the uncoated section 242 of the negative electrode sheet 240 jut out of the separators 262, 264 at mutually opposite sides in the width direction. From among the foregoing, one electrode terminal 420 is fixed to the uncoated section 222 of the positive electrode collector 221, and the other electrode terminal 440 is fixed to the uncoated section 242 of the negative electrode collector 241.

Figure 4:
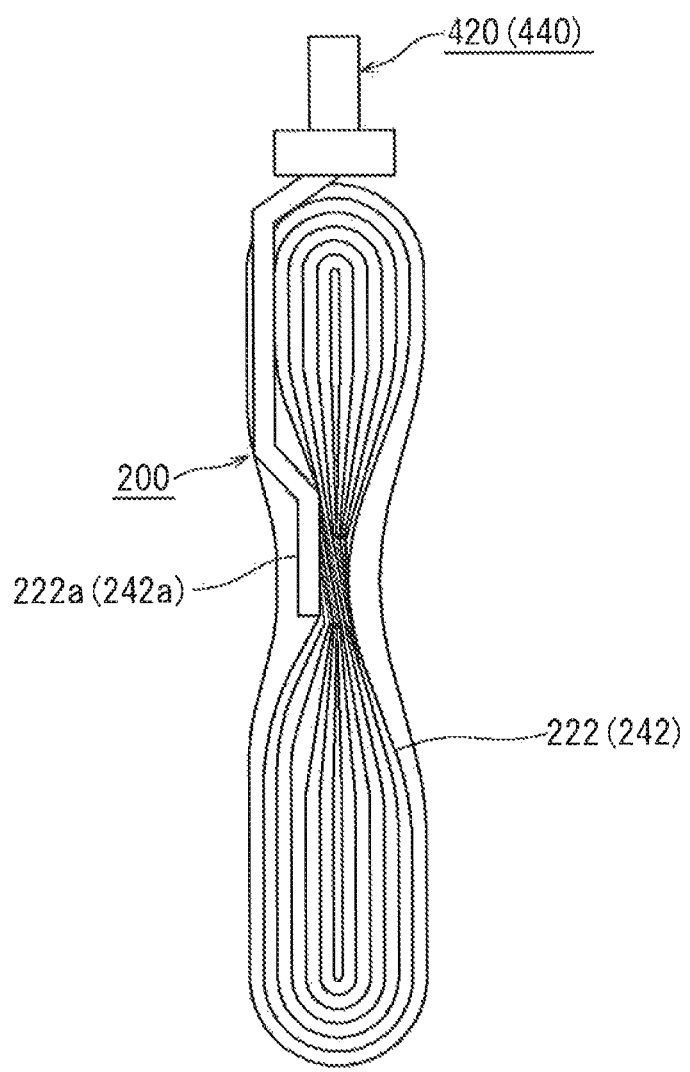
FIG. 4 is a side-view diagram illustrating welding sites of electrode terminals of uncoated sections of a wound electrode body.

In the present example, the electrode terminals 420, 440 of the lid body 340 extend along intermediate portions 222a, 242a of the uncoated section 222 and the uncoated section 242 of the wound electrode body 200, as illustrated in FIG. 1. The tips of the electrode terminals 420, 440 are welded to respective intermediate portions of the uncoated sections 222, 242. FIG. 4 is a side-view diagram illustrating the welding sites of the electrode terminals 420, 440 of the uncoated sections 222, 242 of the wound electrode body 200.

As illustrated in FIG. 4, the uncoated section 222 of the positive electrode collector 221 and the uncoated section 242 of the negative electrode collector 241 are exposed, in the form of a spiral, on both sides of the separators 262, 264. In the present embodiment, the intermediate portions of the uncoated sections 222, 242 are brought together and are welded to the tips of the electrode terminals 420, 440. On account of the differences between materials, the electrode terminal 420 and the positive electrode, collector 221 are welded for instance by ultrasonic welding. The electrode terminal 440 and the negative electrode collector 241 are welded for instance by resistance welding.

The wound electrode body 200, in a pressed and bent flat state, is attached to the electrode terminals 420, 440 that are fixed to the lid body 340. The wound electrode body 200 is accommodated in the flat inner space of the container main body 320. After the wound electrode body 200 is accommodated therein, the container main body 320 is plugged by the lid body 340. A seam 322 (FIG. 1) between the lid body 340 and the container main body 320 is sealed by welding, for instance laser welding. In the present example, thus, the wound electrode body 200 is positioned inside the battery case 300 by the electrode terminals 420, 440 that are fixed to the lid body 340 (battery case 300).

<Electrolyte Solution>

Thereafter, an electrolyte solution is injected into the battery case 300 via an injection hole that is provided in the lid body 340. In the present example, the electrolyte solution that is used contains $LiPF_6$, at a concentration of about 1 mol/liter, in a mixed solvent of ethylene carbonate and diethyl carbonate (for instance, a mixed solvent at a volume ratio of about 1:1). Thereafter, a sealing cap made of metal is attached to the injection hole (for instance, by welding), to seal thereby the battery case 300. A nonaqueous electrolyte solution that is used in conventional lithium-ion secondary batteries can be used herein as the electrolyte solution.

<Outgassing Channel>

In the present example, the flat inner space of the battery case 300 is slightly wider than the flattened wound electrode body 200. Gaps 310, 312 between the wound electrode body 200 and the battery case 300 are provided on both sides of the wound electrode body 200. These gaps 310, 312 constitute outgassing channels.

The temperature of the lithium-ion secondary battery 100 having such a configuration rises if overcharging occurs. When the temperature of the lithium-ion secondary battery 100 rises, gas is generated through decomposition of the electrolyte solution. The generated gas passes through the gaps 310, 312 between the wound electrode body 200 and the battery case 300, on both sides of the wound electrode body 200, and through the safety valve 360, to be smoothly vented to the exterior. In such a lithium-ion secondary battery 100, the positive electrode collector 221 and the negative electrode collector 241 are electrically connected to an external device by way of the electrode terminals 420, 440 that run through the battery case 300.

<Other Battery Forms>

One example of the lithium-ion secondary battery has been explained above, but the lithium-ion secondary battery is not limited to the above-described form. Likewise, the electrode sheet wherein an electrode mixture is coated onto a metal foil may be used in various battery forms. Examples of other known battery forms include, for instance, cylindrical batteries and laminate batteries. In a cylindrical battery, the wound electrode body is accommodated in a cylindrical battery case. In a laminate battery, a positive electrode sheet and a negative electrode sheet are stacked on each other via an interposed separator. The lithium-ion secondary battery 100 has been illustrated as an example, but the same structure can be used in secondary batteries other than lithium-ion secondary batteries.

The positive electrode mixture layer 223 of the present embodiment is explained next.

<Positive Electrode Mixture Layer 223>

Figure 5:
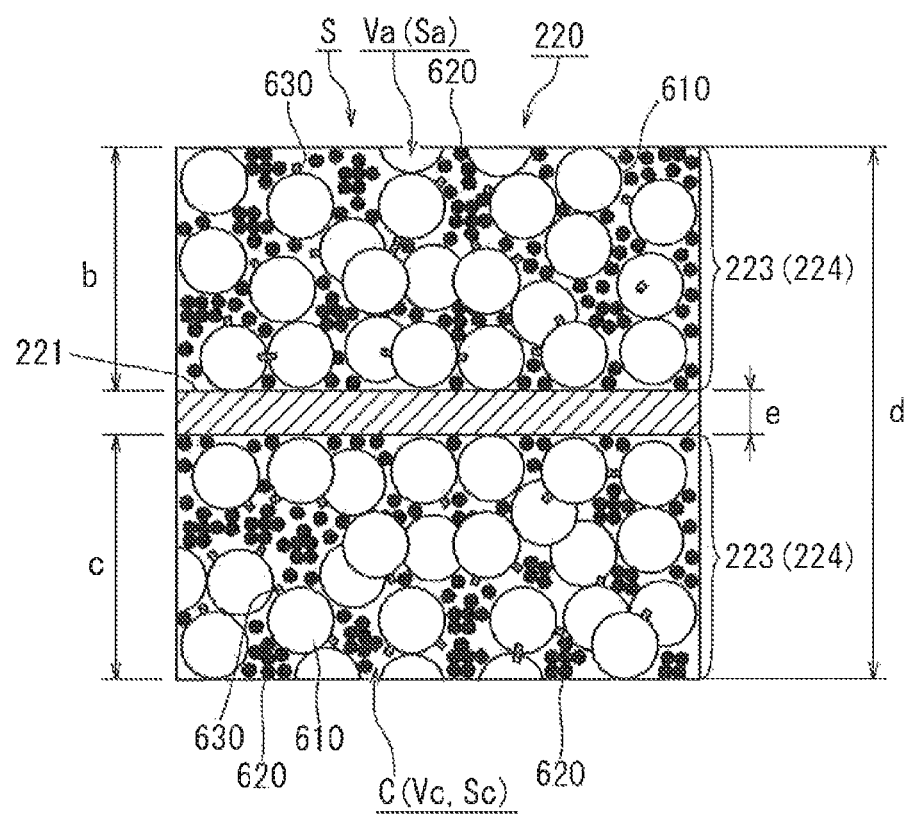
FIG. 5 is a cross-sectional diagram illustrating a structure of a positive electrode mix layer.

FIG. 5 is a cross-sectional diagram of the positive electrode sheet 220 of the lithium-ion secondary battery 100. To render the structure of the positive electrode mixture layer 223 clearer, FIG. 5 illustrates schematically, in an enlarged manner, a positive electrode active material 610 and a conductive material 620 in the positive electrode mixture layer 223. In the present embodiment, both faces of the positive electrode collector 221 of the positive electrode sheet 220 are coated each with a positive electrode mixture 224, as illustrated in FIG. 5. The layer (positive electrode mixture layer 223) of the positive electrode mixture 224 comprises the positive electrode active material 610, the conductive material 620 and a binder 630.

<Positive Electrode Active Material 610>

The positive electrode active material 610 is made up of secondary particles that result from aggregation of a plurality of primary particles (not shown) of a lithium-transition metal oxide. The particle size of the secondary particles ranges from about 3 μm to 12 μm, more preferably from about 3 μm to 8 μm. The median diameter (d50), which is worked out from a particle size distribution that is measured using a particle size distribution measuring instrument in accordance with a light scattering method, is used herein as the particle size. Unless specifically indicated otherwise, the "positive electrode active material 610" refers to secondary particles. Preferably, the particles used in the positive electrode active material 610 can form secondary particles through aggregation of a plurality of primary particles (not shown).

<Conductive Material 620>

As the conductive material 620 there can be used a carbon powder such as acetylene black, oil furnace black, graphitized carbon black, carbon black, graphite, Ketjen black, graphite powder or the like. Herein, one type or a plurality of types of carbon powder may be mixed at a predetermined ratio in the conductive material 620. The particle size of the conductive material 620 is smaller than that of the positive electrode active material 610. For instance, the particle size of the conductive material 620 ranges from about 10 µm to 100 µm.

<Voids in the Positive Electrode Mixture Layer 223>

The positive electrode mixture layer 223 is obtained by applying, as described above, a positive electrode mixture onto a collector (metal foil), followed by drying and rolling. In the positive electrode mixture layer 223, particles are linked to each other, as illustrated in FIG. 5, through the action of the binder 630. In the positive electrode mixture layer 223, the positive electrode active material 610 and the conductive material 620 are in a joined state by way of the binder 630. Therefore, multiple minute cavities are present between the particles. The conductive material 620 is smaller than the positive electrode active material 610 (secondary particles), and hence the conductive material 620 intrudes into a plurality of gaps of the positive electrode active material 610. The positive electrode active material 610 and the positive electrode collector 221 are electrically connected to by way of the conductive material 620. The positive electrode mixture layer 223 has small gaps that must be also regarded as cavities. The electrolyte solution (not shown) impregnates the small gaps of the positive electrode mixture layer 223. The gaps (cavities) that are formed inside the positive electrode mixture layer 223 are referred to as "voids" where appropriate.

In the present embodiment, the porosity X of the positive electrode mixture layer 223 is $30(\%) \leq X \leq 65(\%)$. A mass ratio $\alpha$ of the positive electrode active material 610 in the positive electrode mixture layer 223 is $0.84 \leq \alpha \leq 0.925$, and a mass ratio $\beta$ of the conductive material 620 in the positive electrode mixture layer 223 is $0.06 \leq \beta \leq 0.12$. In the lithium-ion secondary battery 100, an index Y worked out from the expression below is 30 (mL/100 g) $\leq Y \leq 89$ (mL/100 g).

The index Y is given by the expression below, $$Y = A \times \alpha + B \times \beta;$$

where A is the DBP absorption number (mL/100 g) of the positive electrode active material 610;

$\alpha$ is the mass ratio of the positive electrode active material 610 in the positive electrode mixture layer 223;

B is the DBP absorption number (mL/144 g) of the conductive material 620; and $\beta$ is the mass ratio of the conductive material 620 in the positive electrode mixture layer 223.

The state of the voids, the porosity X and the index Y of the positive electrode mixture layer 223 are sequentially explained below.

<State of the Voids in the Positive Electrode Mixture Layer 223>

The state of the voids in the positive electrode mixture layer 223 can be inspected in accordance with a mercury intrusion method that relies on, for instance, a mercury porosimeter. In the mercury intrusion method, a sample of the positive electrode sheet 220 is firstly evacuated, and is immersed in mercury. In this state, the pressure acting on the mercury is raised, as a result of which mercury gradually intrudes into small spaces. According to the mercury intrusion method, a volume Vc of the voids C that are firmed inside the positive electrode mixture layer 223 can be worked out on the basis of the relationship between the pressure acting on mercury and the amount of mercury that has intruded into the positive electrode mixture layer 223.

An instrument Autopore III9410 by SHIMADZU CORPORATION can be used as the mercury porosimeter. The distribution of pores ranging from about 50 µm to 0003 µm in the positive electrode mixture layer 223 can be measured by measuring the pressure acting on mercury in a range from 4 psi to 60000 psi. In the measurement of the positive electrode mixture layer 223, the volume of the voids comprised in the positive electrode mixture layer 223 may be measured using a mercury porosimeter for a plurality of samples that are taken from the positive electrode sheet 220 (FIG. 2).

<Porosity X>

An example of the measurement method of the porosity X is given next. The porosity X of the positive electrode mixture layer 223 denotes herein the proportion of voids C in the positive electrode mixture layer 223. The proportion of voids (porosity) in the positive electrode mixture layer 223 can be represented, for instance, by a ratio (Vc/Va) of a volume Vc of voids formed in the interior of the positive electrode mixture layer 223, with respect to the apparent volume Va of the positive electrode mixture layer 223. Such a ratio (Vc/Va) will be referred to herein as "porosity" where appropriate. It is possible to detect, for instance on the basis of the size of the voids formed between the particles of the conductive material 620, whether or not the conductive material 620 is clustered densely between the positive electrode active material 610 and the positive electrode collector 221. The porosity X can be worked out on the basis of a ratio (Vc/Va) of the volume Vc of the voids, as obtained in accordance with the mercury intrusion method, and the apparent volume Va of the positive electrode mixture layer 223. The apparent volume Va of the positive electrode mixture layer 223 is worked out based on the product of the surface area S of the positive electrode sheet and the thickness of the positive electrode mixture layer 223. Accordingly, the porosity X can be given by the expression below.

Porosity $X$=(volume $Vc$ of the voids $C$)/(volume $Va$ of the positive electrode mixture layer)

FIG. 5 is a diagram illustrating schematically a cross-section of the positive electrode sheet 220. As illustrated in FIG. 5, the volume Va (not shown) of the positive electrode mixture layer 223 can be worked out based on the product of a surface area S1, in a plan view, of a sample of the positive electrode sheet 220, and the thickness a (not shown) of the positive electrode mixture layer 223 (Va=S1×a).

In the present embodiment, the positive electrode mixture layer 223 is formed on both faces of the positive electrode collector 221. Accordingly, the thickness a of the positive electrode mixture layer 223 can be worked out as the sum of the thicknesses b and c of the positive electrode mixture layer 223 on both faces (i.e. a=b+c). In another method, the thickness a of the positive electrode mixture layer 223 can be worked out in the form of a difference (d−e) between the thickness d of the entire positive electrode sheet 220 a thickness e of the positive electrode collector 221 (i.e. a=d−e). The surface area S, in a plan view, of the sample of the positive electrode sheet 220 can be worked out easily, for instance, by cutting a square or rectangular sample out of the positive electrode sheet 220. Thus, the volume Va of the positive electrode mixture layer 223 alone can be worked out by obtaining the surface area S, in a plan view, of the sample of the positive electrode sheet 220 and the thickness a of the positive electrode mixture layer 223.

It is deemed that the porosity X is not necessarily uniform in the positive electrode mixture layer 223 that is coated onto the positive electrode collector 221. Accordingly, it suffices to take a plurality of samples of the positive electrode sheet 220, calculating the porosity X of the respective positive electrode mixture layer, and working out an average value thereof as the porosity X of the positive electrode mixture layer. A greater porosity X denotes a greater presence of voids, in the positive electrode mixture layer 223, that can be impregnated by the electrolyte solution. The porosity X can also be approximated in accordance with a different method.

<Example of Another Method for Measuring the Porosity X>

For instance, the porosity X can be approximated in the form of a ratio (Sc/Sa) of a surface area Sc taken up by voids C per unit cross-sectional area of the positive electrode mixture layer 223, and an apparent cross-sectional area Sa of the positive electrode mixture layer 223, in a cross-sectional sample of the positive electrode mixture layer 223 such as the one illustrated in FIG. 5. In this case, there may be worked out the ratio (Sc/Sa) of a plurality of cross-section samples of the positive electrode mixture layer 223. The greater the number of cross-sectional samples in the positive electrode mixture layer 223, the more accurately can the porosity X be approximated by the ratio (Sc/Sa). Herein, for instance, cross-sectional samples may be taken in a plurality of cross-sections that are perpendicular to one arbitrary direction of the positive electrode sheet 220, along that arbitrary direction.

The cross-sectional samples of the positive electrode mixture layer 223 may be obtained, for instance, in the form of a cross-sectional SEM image. The cross-sectional SEM image is herein a cross-sectional micrograph obtained using an electron microscope. For instance, any cross-section of the positive electrode sheet 220 can be obtained in a CP process (cross-section polisher process). As the electron microscope there can be used a scanning electron microscope (FE-SEM) HITACHI S-4500 by Hitachi High-Technologies Corporation. Cross-sections of the substances that make up the positive electrode mixture layer 223, as well as the voids C that are formed in the interior of the positive electrode mixture layer 223, can be specified on the basis of differences in tone and shading in cross-sectional SEM images of the positive electrode mixture layer 223. The method for measuring porosity is not limited to the above-described one.

<DBP Absorption Number (mL/100 g)>

The DBP absorption number (mL/100 g) is worked out according to JIS K6217-4 "Carbon black for rubber, fundamental properties-part 4: determination of DBP absorption". A reagent liquid in the form of DBP (dibutyl phthalate) is dripped onto the powder to be inspected, using a constant-rate burette, and changes in viscosity characteristic are measured by way of a torque detector. The addition amount of the reagent liquid per unit weight of the powder to be inspected, which corresponds to a 70% torque of the maximum generated torque, is taken as the DBP absorption number.

<Index Y>

The index Y is explained next.

The index Y of the lithium-ion secondary battery 100 (FIG. 1) as worked out on the basis of the expression below is 30 (mL/100 g)≤Y≤89 (mL/100 g).

The expression is $Y = A \times \alpha + B \times \beta$, where A is the DBP absorption number (mL/100 g) of the positive electrode active material 610; $\alpha$ is the mass ratio of the positive electrode active material 610 in the positive electrode mixture layer 223; B is the DBP absorption number (mL/100 g) of the conductive material 620; and $\beta$ is the mass ratio of the conductive material 620 in the positive electrode mixture layer 223. In other words, the index Y worked out based on that expression denotes approximately the DBP absorption number (mL/100 g) of the conductive material 620 and the positive electrode active material 610 comprised per unit weight of the positive electrode mixture layer 223. The index Y denotes to which extent the electrolyte solution that impregnates the positive electrode mixture layer 223 can be absorbed by the positive electrode active material 610 and the conductive material 620. That is, the higher the index Y the easier it becomes for the electrolyte solution that impregnates the positive electrode mixture layer 223 to be absorbed by the positive electrode active material 610 and the conductive material 620. Herein, $\alpha$ and $\beta$ are both weight ratios, and hence there holds $(\alpha+\beta) \leq 1.0$ (100%).

<Proportion of Positive Electrode Active Material and Conductive Material>

In the present embodiment, the mass ratio $\alpha$ of the positive electrode active material 610 in the positive electrode mixture layer 223 is $0.84 \leq \alpha \leq 0.925$. The mass ratio 13 of the conductive material 620 in the positive electrode mixture layer 223 is $0.06 \leq \beta \leq 0.12$. In the present embodiment, the positive electrode mixture layer 223 comprises a required positive electrode active material 610 for eliciting a high-rate characteristic. The positive electrode active material 610, having a lithium-transition metal oxide as a main component, has no conductivity of itself. In the present embodiment, the positive electrode mixture layer 223 comprises an appropriate amount of the conductive material 620, sufficient to secure traffic of electrons between the positive electrode collector 221 and the positive electrode active material 610.

In the lithium-ion secondary battery 100 (FIG. 1), the porosity X of the positive electrode mixture layer 223 of the positive electrode sheet 220 is 30(%)≤X≤65(%). The mass ratio $\alpha$ of the positive electrode active material 610 in the positive electrode mixture layer 223 is $0.84 \leq \alpha \leq 0.925$, and the mass ratio $\beta$ of the conductive material 620 in the positive electrode mixture layer 223 is $0.06 \leq \beta \leq 0.12$. In the lithium-ion secondary battery 100, the index Y worked out based on the above-described expression is 30 (mL/100 g)≤Y≤89 (mL/100 g).

In such a lithium-ion secondary battery 100, the porosity X of the positive electrode mixture layer 223 is 30(%)≤X≤65(%), and there is a given amount, or greater, of voids (open voids) into which the electrolyte solution can penetrate. The index Y worked out on the basis of the above expression denotes the degree of ease with which the electrolyte solution that impregnates the positive electrode mixture layer 223 can be absorbed by the positive electrode active material and the conductive material. In the lithium-ion secondary battery 100, the index Y is 30 (mL/100 g)≤Y≤89 (mL/100 g). The electrolyte solution that impregnates the positive electrode mixture layer 223 can thus be absorbed by the positive electrode active material 610 and the conductive material 620. As a result, liquid dry-up in which the electrolyte solution becomes insufficient in the positive electrode mixture layer 223 is unlikely to occur.

In the lithium-ion secondary battery 100, the positive electrode active material 610 (FIG. 5) and the conductive material 620 comprised in the positive electrode mixture layer 223 have a required DBP absorption number. The lithium-ion secondary battery 100 is provided with the required positive electrode active material 610 and conductive material 620 per unit weight of the positive electrode mixture layer 223. As a result, there is afforded a lithium-ion secondary battery having an excellent high-rate characteristic and in which resistance increases derived from charge and discharge cycles are kept low.

Accordingly, the positive electrode mixture layer 223 is impregnated with the required electrolyte solution, such that liquid dry-up in which the electrolyte solution is insufficient is unlikely to occur. The positive electrode mixture layer 223 comprises an appropriate amount of positive electrode active material 610 and conductive material 620, in terms of mass ratio. Required reactions can thus take place in the positive electrode of the lithium-ion secondary battery 100 by virtue of the positive electrode active material 610. The required conductivity in the positive electrode mixture layer 223 is secured by the conductive material 620. As a result, the lithium-ion secondary battery 100 affords a required high-rate characteristic, with curtailment of the resistance increase that accompanies charge and discharge cycles.

The inventors performed an evaluation test such as the below-described one. The inventors studied the way in which the porosity X and index Y of the positive electrode mixture layer 223, the mass ratio β of the positive electrode active material 610 in the positive electrode mixture layer 223, and the mass ratio β of the conductive material 620 in the positive electrode mixture layer 223, exerted an influence on the high-rate characteristic of the lithium-ion secondary battery 100 and on the resistance increase that accompanies charge and discharge cycles.

<Evaluation Test>

In the evaluation test there were prepared the positive electrode active material 610 and the conductive material 620 having respectively dissimilar DBP absorption numbers (mL/100 g). The positive electrode sheet 220 was produced by modifying the mass ratios of the positive electrode active material 610 and the conductive material 620 in the positive electrode mixture layer 223. The above-described porosity X and the index Y worked out based on the above-described expression were obtained for the positive electrode sheet 220. A battery for evaluation testing was produced using the positive electrode sheet 220. A test was performed using the battery for evaluation testing. There was evaluated the influence exerted on battery performance by the above-described porosity X and the index Y that is worked out in accordance with the above expression.

In the evaluation test, active material particles having a composition represented by $Li_{1.15}Ni_{0.34}Co_{0.33}Mn_{0.33}O_2$ were used as the positive electrode active material 610. The process for generating active material particles was tweaked to enable formation of particles having non-regular shapes, such as porous, hollow and near-spherical particles, as the secondary particles of the active material particles.

Figure 6:
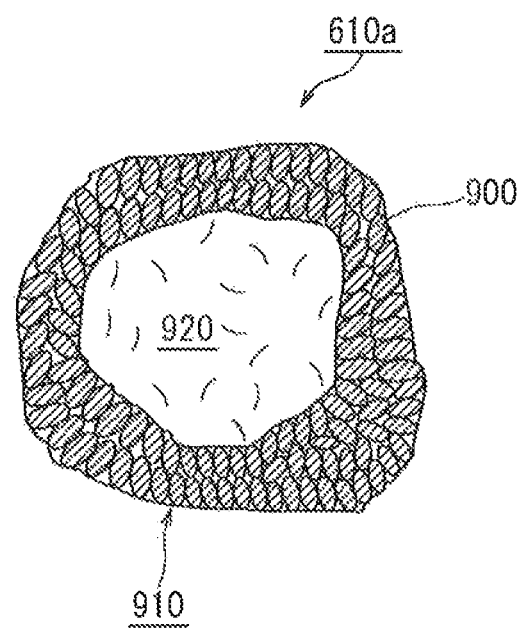
FIG. 6 is a diagram illustrating one example of positive electrode active material particles.

Three structures of secondary particles of the positive electrode active material 610 were prepared herein, so-called "hollow structure", "perforated hollow structure" and "solid structure". FIG. 6 illustrates schematically a positive electrode active material 610a of "hollow structure". As illustrated in FIG. 6, each secondary particle of "hollow structure" has a secondary particles 910 resulting from aggregation of a plurality of primary particles 900 of the above-described lithium-transition metal oxide ($Li_{1.15}Ni_{0.34}Co_{0.33}O_2$), and a hollow section 920 that is formed in the secondary particles 910. The "hollow structure" may be porous and have fine through-holes that run through from the exterior into the hollow section.

Figure 7:
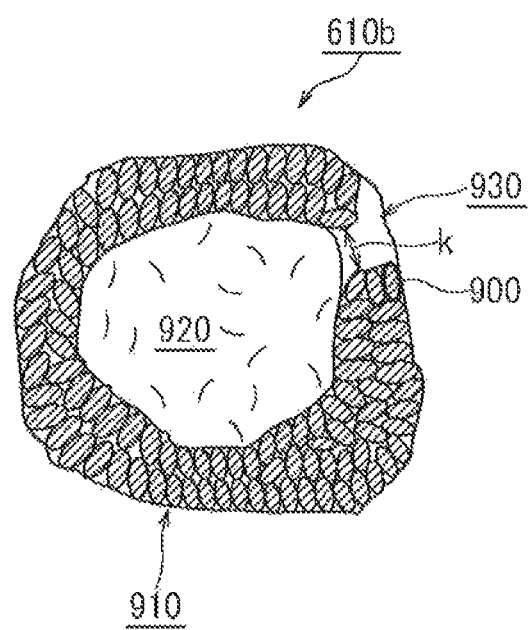
FIG. 7 is a diagram illustrating one example of positive electrode active material particles.

FIG. 7 is a diagram illustrating schematically one secondary particle 610b of "perforated hollow structure". The secondary particles 910 of "perforated hollow structure" further has a through-hole 930 that rims through the secondary particles 910, so as to link the hollow section 920 with the exterior. The "hollow structure" does not have this distinctive through-hole 930. Secondary particles having a "solid structure", which are not depicted, have a structure wherein primary particles 900 are aggregated but without a distinctive hollow section. The positive electrode active material 610 exhibits differences in the DBP absorption number depending on such differences in structure, and depending on differences in average particle size for a same structure. Herein, the average particle size (d50) of the secondary particles of the active material particles was set to range from 3 μm to 12 μm.

Acetylene black (AB) was used as the conductive material 620 in the evaluation test. Differences in the DBP absorption number arise as well in the conductive material 620 depending on, for instance, the average particle size of the powder. The solvent used in the evaluation test was N-methyl-2-pyrrolidone (NMP); polyvinylidene fluoride (PVDF) was used as the binder 630.

Battery for Evaluation Testing>

Figure 8:
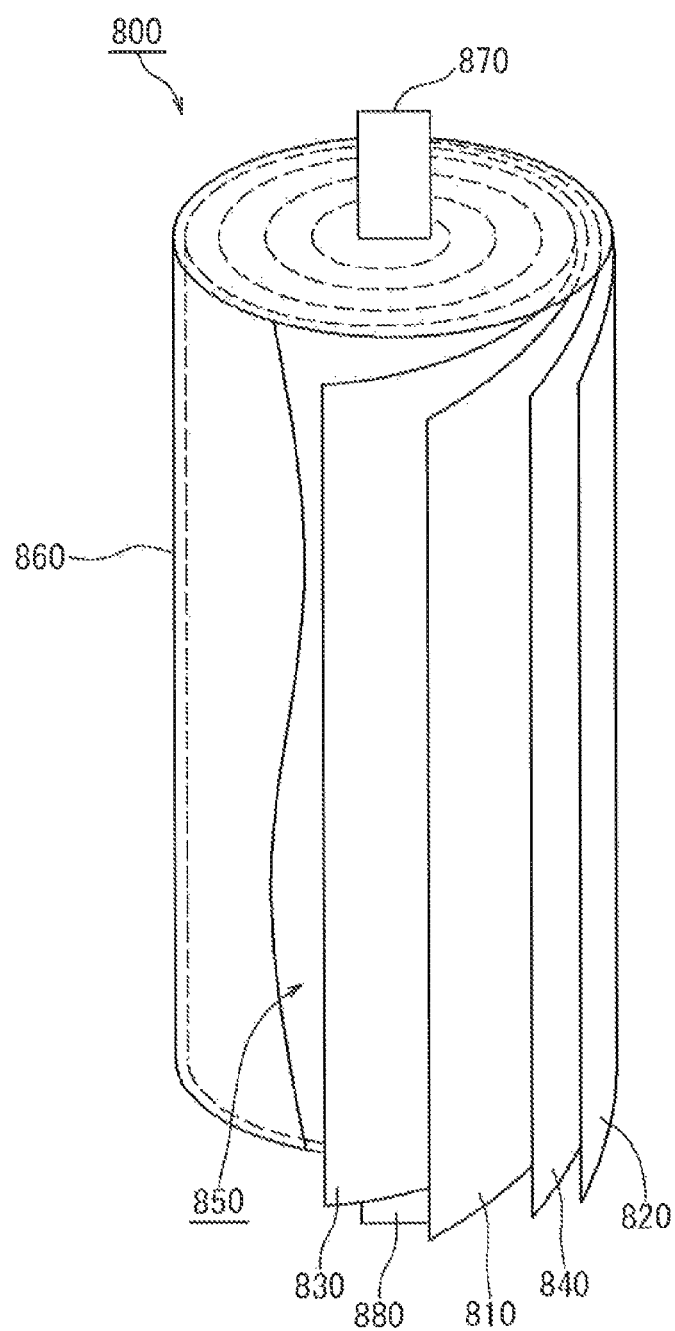
FIG. 8 is a schematic diagram of a 18650-type cell that is used in an evaluation test.

A battery for evaluation testing 800 produced herein is a cylindrical lithium-ion secondary battery referred to as of 18650 type, as illustrated in FIG. 8. The rated capacity of the battery for evaluation testing 800 was set to about 220 mAh.

As illustrated in FIG. 8, the battery for evaluation testing 800 comprises a wound electrode body 850 wherein separators 830, 840 are interposed between a positive electrode sheet 810 and a negative electrode sheet 820. The wound electrode body 850 is produced through winding of a stacked sheet resulting from stacking the positive electrode sheet 810, the negative electrode sheet 820 and the two separators 830, 840. The positive electrode sheet 810 and the negative electrode sheet 820 of the battery for evaluation testing 800 were set to have substantially the same cross-sectional structure as that of the positive electrode sheet 220 or the negative electrode sheet 240 (FIG. 1) of the above-described lithium-ion secondary battery 100. Porous polyethylene sheets having a thickness of 20 μm were used as the separators 830, 840. The battery for evaluation testing 800 (18650-type lithium ion battery for evaluation testing) was constructed by accommodating the wound electrode body 850 together with a nonaqueous electrolyte solution (not shown) in an outer case 860. As illustrated in FIG. 8, the outer case 860 is substantially cylindrical in shape, and is provided with electrode terminals 870, 880 that are connected in the interior of the positive electrode sheet 810 and the negative electrode sheet 820, at both end sides of the cylinder. In the battery for evaluation testing 800 there was used a nonaqueous electrolyte solution having a composition wherein $LiPF_6$ was dissolved, to a concentration of 1 mol/L, in a mixed solvent that comprised EC, DMC and EMC at a 3:3:4 volume ratio.

Samples of a plurality of lithium-ion secondary batteries for evaluation testing were obtained by varying the type and mass ratio of the positive electrode active material and the conductive material. A plurality of batteries that were used in various tests was produced in Samples 1 to 17. The same conditions applied in the evaluation test of Samples 1 to 17, except for the DBP absorption number (mL/100 g) of the positive electrode active material 610 and the conductive material 620, and that blending ratio (mass ratio) of the positive electrode active material 610, the conductive material 620 and the binder 630 in the positive electrode mixture. For instance, the basis weight of the positive electrode mixture 224 with respect to the positive electrode collector 221 is identical across Samples 1 to 17. The evaluation test results are given in Table 1. The DBP absorption number and mass ratio of the positive electrode active material and the conductive material in Samples 1 to 17 are as set forth in Table 1. The above-described positive electrode active material 610a of "hollow structure" was used in Samples 1 to 5. The above-described positive electrode active material 610b of "perforated hollow structure" was used in Samples 6 to 14. The above-described positive electrode active material 610 of "solid structure" was used in Samples 15 to 17.

TABLE 1

| Sample | Index Y (mL/100 g) | Porosity X (%) | DBP absorption number of constituent material in positive electrode mixture layer | | Mass ratio of constituent material in positive electrode mixture layer | | 10-second resistance at 50 C discharge (mΩ) | 20 C discharge cycle resistance increase |
|---|---|---|---|---|---|---|---|---|
| | | | Positive electrode active material A (mL/100 g) | Conductive material B (mL/100 g) | Positive electrode active material α | Conductive material β | | |
| 1  | 32.4 | 32 | 25.5 | 102 | 0.870 | 0.10 | 66  | 1.32 |
| 2  | 33.4 | 41 | 27.0 | 140 | 0.925 | 0.06 | 64  | 1.24 |
| 3  | 33.6 | 41 | 30.0 | 140 | 0.925 | 0.06 | 65  | 1.21 |
| 4  | 36.3 | 38 | 30.0 | 102 | 0.870 | 0.10 | 65  | 1.25 |
| 5  | 40.8 | 38 | 35.2 | 102 | 0.870 | 0.10 | 62  | 1.28 |
| 6  | 41.7 | 41 | 36.2 | 102 | 0.870 | 0.10 | 68  | 1.12 |
| 7  | 46.0 | 38 | 41.1 | 102 | 0.870 | 0.10 | 61  | 1.09 |
| 8  | 49.0 | 54 | 36.2 | 175 | 0.870 | 0.10 | 52  | 1.08 |
| 9  | 52.1 | 32 | 52.0 | 140 | 0.840 | 0.06 | 67  | 1.31 |
| 10 | 56.6 | 41 | 41.1 | 368 | 0.840 | 0.06 | 60  | 1.18 |
| 11 | 55.9 | 46 | 52.0 | 120 | 0.890 | 0.08 | 59  | 1.10 |
| 12 | 58.6 | 39 | 52.0 | 175 | 0.925 | 0.06 | 61  | 1.06 |
| 13 | 65.3 | 52 | 59.2 | 175 | 0.925 | 0.06 | 53  | 1.14 |
| 14 | 88.9 | 41 | 59.2 | 398 | 0.880 | 0.10 | 63  | 1.05 |
| 15 | 27.6 | 31 | 20.0 | 102 | 0.870 | 0.10 | 121 | 3.32 |
| 16 | 29.0 | 38 | 20.0 | 175 | 0.924 | 0.06 | 109 | 4.55 |
| 17 | 29.8 | 43 | 22.6 | 102 | 0.870 | 0.10 | 105 | 3.15 |

Table 1 sets out the "index Y", "porosity X", "DBP absorption number A of the positive electrode active material", "DBP absorption number B of the conductive material", "mass ratio α of the positive electrode active material", "mass ratio β of the conductive material", "10-second resistance at 50 C discharge" and "20 C discharge cycle resistance increase" of Samples 1 to 17.

<Conditioning>

Sequential explanations follow next on a conditioning step, measurement of rated capacity, and SOC adjustment in the batteries for evaluation testing thus constructed.

The conditioning step was performed according to Procedures 1 and 2 below.

Procedure 1: Reach 4.1 V at 1 C constant current charging, followed by a pause of 5 minutes.

Procedure 2: After Procedure 1, charging through constant voltage charging for 1.5 hours, followed by a pause of 5 minutes.

<Measurement of Rated Capacity>

The rated capacity in the batteries for evaluation testing after the abovementioned conditioning step was measured in accordance with Procedures 1 to 3 below, in a voltage range from 3.0 V to 4.1 V, at a temperature 25° C.

Procedure 1: After reaching 3.0 V through 1 C constant current discharge, the battery is discharged at constant voltage for 2 hours, followed by a pause of 10 seconds.

Procedure 2: After reaching 4.1 V through 1 C constant current charging, the battery is charged at constant voltage for 2.5 hours, followed by a pause of 10 seconds.

Procedure 3: After reaching 3.0 V through 0.5 C constant current discharge, the battery is discharged at constant voltage for 2 hours, followed by a pause of 10 seconds.

Rated capacity: the rated capacity is set as the discharge capacity (CCCV discharge capacity) for discharge from constant current discharge to constant voltage discharge in Procedure 3.

<SOC Adjustment>

In SOC adjustment, the batteries for evaluation testing produced as described above are adjusted in accordance with Procedures 1 and 2 below, in a temperature environment of 25° C. Herein, SOC adjustment may be performed after the abovementioned conditioning step and measurement of rated capacity.

Procedure 1: The battery is charged, from 3 V, at 1 C constant current, up to a state of charge of about 60% of the rated capacity (SOC 60%). Herein, "SOC" denotes "state of charge".

Procedure 2: After Procedure 1, the battery is charged at constant voltage for 2.5 hours.

Each battery for evaluation testing 800 can be thus adjusted to a predetermined state of charge.

<High-Rate Discharge Characteristic Evaluation (10-Second Resistance at 50 C Discharge)>

The "10-second resistance at 50 C discharge" was obtained next in accordance with Procedures 1 and 2 below.

Procedure 1: Adjustment to a predetermined state of charge through the above SOC adjustment, followed by a pause of 10 seconds.

Procedure 2: After Procedure 1, the battery is discharged at 50 C (herein, 11 A) constant current, and IV resistance is calculated from the voltage after 10 seconds. The "10-second resistance at 50 C discharge" in Table 1 denotes the abovementioned IV resistance. The respective average value for the above evaluation test, performed in a plurality of batteries for evaluation testing 800, is given for Samples 1 to 17.

<High-Rate Cycle Characteristic Evaluation at Low Temperature (Resistance Increase Rate by 20 C)>

Figure 9:
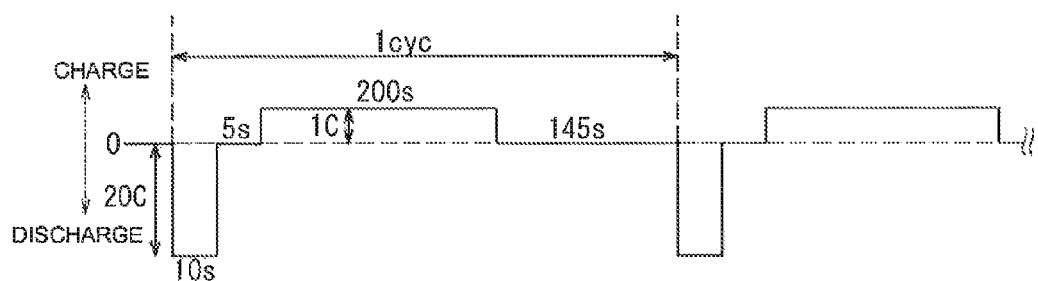
FIG. 9 is a diagram illustrating a charge and discharge cycle in an evaluation test of high-rate cycle characteristic at low temperature.

Next, dissimilar batteries of a same sample were adjusted to SOC 60%, and a high rate cycle test was performed that involved 2500 repetitions of a charge and discharge cycle that consisted of (I) to (V) below; in a temperature environment of −1.5° C. During the process, the SOC was adjusted to 60% every 100 cycles. FIG. 9 illustrates a charge and discharge cycle of the characteristic evaluation test.

(I). Discharge for 10 seconds at 20 C (herein, 4.4 A) constant current.

(II). Pause of 5 seconds.

(III). Charging at 1 C constant current for 200 seconds.

(IV). Pause of 145 seconds.

(V). The rate of increase of resistance upon discharge (I) in each cycle is measured.

(SOC adjustment is performed every 100 repetitions of the charge and discharge cycle consisting of (I) to (V) above.)

The "resistance increase rate by 20 C" in Table 1 denotes the rate of increase of resistance for discharge (I), on the 2500-th cycle.

As illustrated in Table 1, Samples 15 to 17 from among Samples 1 to 17 have values of index Y (mL/100 g) of 27.6, 29.0 and 29.8, respectively. The "10-second resistance at 50 C discharge (mΩ)" exhibit resistances of 121, 109 and 105 that are significantly higher than those of other Samples 1 to 14. The "resistance increase rate by 20 C" is 3.32, 4.55 and 3.15; i.e. the resistance increase rate is high also in the high-rate cycle characteristic evaluation at low temperature.

In other Samples 1 to 14, by contrast, the porosity X of the positive electrode mixture layer is $30(\%) \leq X \leq 65(\%)$. The mass ratio α of the positive electrode active material in the positive electrode mixture layer is $0.84 \leq \alpha \leq 0.925$, and the mass ratio β of the conductive material in the positive electrode mixture layer is $0.06 \leq \beta \leq 0.12$. The index Y is 30 (mL/100 g)$\leq Y \leq 89$ (mL/100 g). The "10-second resistance at 50 C discharge (mΩ)" is low, from 52 to 68. The "resistance increase rate by 20 C" ranges from 1.05 to 1.32; i.e. the resistance increase rate is low also in the high-rate cycle characteristic evaluation at low temperature.

Thus, the performance of the lithium-ion secondary battery, in particular the high-rate discharge characteristic and the high-rate cycle characteristic evaluation at low temperature, is enhanced by virtue of the fact that the porosity X of the positive electrode mixture layer is $30(\%) \leq X \leq 65(\%)$ the mass ratio α of the positive electrode active material in the positive electrode mixture layer is $0.84 \leq \alpha \leq 0.925$, the mass ratio β of the conductive material in the positive electrode mixture layer is $0.06 \leq \beta \leq 0.12$, and the index Y is 30 (mL/100 g)$\leq Y \leq 89$ (mL/100 g). The above effects are elicited by virtue of the structural features of the positive electrode mixture layer 223, and so long as the above conditions are satisfied, substantially the same effect can be achieved regardless of the type of the positive electrode active material or conductive material.

Figure 10:
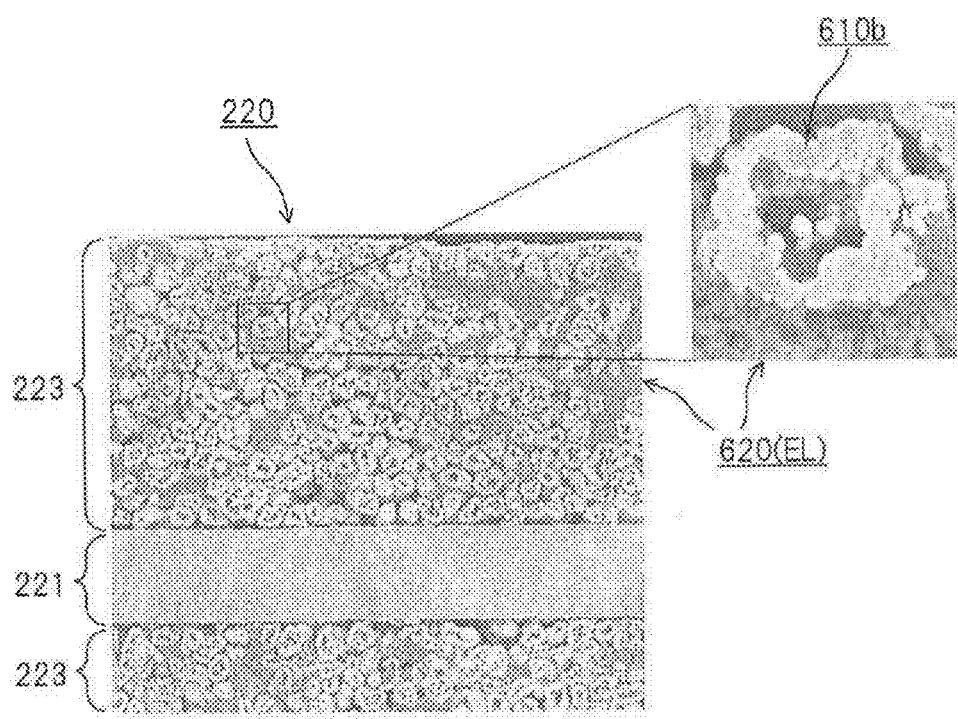
FIG. 10 is one example of a cross-sectional SEM image of a positive electrode sheet.

The porosity X of the positive electrode mixture layer illustrates the proportion of the voids that are impregnated by the electrolyte solution in the positive electrode mixture layer 223. In the lithium-ion secondary battery 100, the porosity X of the positive electrode mixture layer 223 was set to $30(\%) \leq X$. Preferably, the porosity X of the positive electrode mixture layer 223 may be $33(\%) \leq X$, more preferably $38(\%) \leq X$. A trend exists thus whereby the larger the porosity X positive electrode mixture layer 223, the more preferable the latter is. Accordingly, no particular constraints are imposed on the upper limit of the porosity X, and the latter may be of feasibly appropriate magnitude. Therefore, it is sufficient for the porosity X to be of appropriate magnitude, as feasibility allows, for instance of about 0.65. The porosity X may be greater than 65(%), but if the porosity X is excessively high, electron paths may fail to form between the positive electrode active material 610 and the conductive material 620, and current collection ability may be impaired. For instance, the porosity X may be 65% or lower, for instance about 60%, and more preferably about 57(%). It is deemed that, as a result, electron paths can be formed more reliably between the positive electrode active material 610 and the conductive material 620, and that, accordingly, a secondary battery can be obtained that has a more stable performance. FIG. 10 is one example of a cross-sectional SEM image of the positive electrode sheet 220. For instance, the conductive material 620 is clustered densely between particles of the positive electrode active material 610b, as illustrated in the portion denoted by EL in FIG. 10. The positive electrode active material 610b is a positive electrode active material 610b of the below-described perforated hollow structure.

<Lithium Ion Secondary Battery 100>

The constituent materials of the positive electrode mixture layer 223, the composition ratio thereof, as well as the application conditions, drying conditions, rolling conditions and so forth in the step of forming the positive electrode mixture layer 223 may be adjusted in such a manner that the required porosity X and index Y are achieved in the lithium-ion secondary battery 100 (FIG. 1).

The positive electrode active material 610 (FIG. 5) having the required DBP absorption number (mL/100 g) may be used in such a positive electrode mixture layer 223. For instance, an irregular-shape or porous active material may be selected as the positive electrode active material 610.

The positive electrode active material 610b of perforated hollow structure illustrated in FIG. 7 can be used as a positive electrode active material that is appropriate for the lithium-ion secondary battery 100. The positive electrode active material 610b comprises the secondary particles 910 that result from aggregation of a plurality of primary particles (not shown) of a lithium-transition metal oxide, the hollow sections 920 formed in the secondary particles 910, and the through-hole 930 that runs through the secondary particles 910 so as to link the hollow section 920 with the exterior.

In the positive electrode active material 610b, the electrolyte solution can flow easily between the hollow section 920 and the exterior through via the through-hole 930, such that the electrolyte solution in the hollow section 920 is replaced properly. Accordingly, liquid dry-up in which the electrolyte solution is insufficient is unlikely to occur in the hollow section 920. The primary particles 900 of the positive electrode active material 610b can as a result be utilized more actively in the interior of the hollow section 920. In turn, this allows further enhancing the output characteristic of the secondary battery.

In this case, an opening width k of the through-hole 930 may be 0.01 μm or larger in average. This way, the electrolyte solution flows more reliably into the interior of the hollow section 920, and the above-described effect can be brought about yet more readily. The opening width k of the through-hole 930 may be 2.0 μm or smaller in average. Herein, the opening width k of the through-hole 930 denotes the length across the narrowest portion of the through-hole 930 (i.e. the inner diameter of the through-hole 930) that runs through the secondary particle, from outside the active material particle to the hollow section 920. In a case where the hollow section 920 has a plurality of through-holes 930, there may be evaluated a through-hole 930 having the largest opening width k from among the plurality of through-holes 930. The opening width k of the through-hole 930 may be 2.0 μm or smaller in average, more preferably 1.0 μm or less in average, and yet more preferably 0.5 μm or less in average. The opening width k of the through-hole 930 may be ascertained, for instance, on the basis of a cross-sectional SEM image.

The number of through-holes 930 may be about 1 to 20 through-holes in average, more preferably about 1 to 5 through-holes in average, per particle of the positive electrode active material 610b of perforated hollow structure. The positive electrode active material 610b having such a structure can elicit the effect of further stabilizing good battery performance (for instance, by suppressing deterioration derived from charge and discharge cycles). The number of through-holes 930 in the positive electrode active material 610b having a perforated hollow structure may be worked by ascertaining the number of through-holes per particle in at least ten active material particles arbitrarily selected, and working out then the arithmetic mean value. The method for producing the positive electrode active material 610b of perforated hollow structure may include, for instance, a starting material hydroxide generation step, a mixing step and a firing step.

The starting material hydroxide generation step is a step in which ammonium ions are supplied to an aqueous solution of the transition metal compound, to cause thereby particles of the transition metal hydroxide to precipitate out of the aqueous solution. The aqueous solution may comprise at least one transition metal element that makes up the lithium-transition metal oxide. The starting material hydroxide generation step may comprise a nucleation stage in which the transition metal hydroxide is caused to precipitate from the aqueous solution at pH 12 or higher and at an ammonium ion concentration of 25 g/L or lower, and a particle growth stage in which the precipitated transition metal hydroxide is caused to grow at pH lower than 12 and at an ammonium ion concentration of 3 g/L or higher.

The mixing step is a step of preparing an unfired mixture of particles of the transition metal hydroxide obtained in the starting material hydroxide generation step, and a lithium compound. The firing step is a step of obtaining active material particles by firing the mixture obtained in the mixing step. Such a method allows appropriately producing the positive electrode active material 610b of perforated hollow structure.

Herein, the firing step may be performed in such a manner that a highest firing temperature ranges from 800° C. to 1100° C. Primary particles undergo thereby sufficient sintering, and hence it becomes possible to appropriately produce active material particles having a desired average hardness. The firing step is preferably performed in such a manner that secondary particles are formed that exhibit substantially no gaps at grain boundaries between primary particles, at portions other than the hollow section 920 and the through-hole 930.

The firing step may comprise a first firing stage of firing the abovementioned mixture at a temperature T1 ranging from 700° C. to 900° C., and a second firing stage of firing the resulting product having undergone the first firing stage, at a temperature T2 that ranges from 800° C. to 1100° C. and is higher than the firing temperature T1 in the first firing stage.

In a preferred form of the method for producing active material particles disclosed herein, the firing step includes a first firing stage of firing a mixture at a temperature T1 that ranges from 700° C. to 900° C., and a second firing stage of firing the resulting product having undergone the first firing stage, at a temperature T2 that ranges from 800° C. to 1100° C. and is higher than the firing temperature T1 in the first firing stage. Active material particles having the preferred perforated hollow structure disclosed herein can be appropriately produced through firing of the above-described mixture, in a manner that includes the first and the second firing stages. For instance, the positive electrode active material 610a having a "hollow structure" such as the one illustrated in FIG. 6 can be obtained in accordance with the same method, by appropriately tweaking the firing step.

In this case, the BET specific surface area of the positive electrode active materials 610a, 610b of hollow structure ranges preferably from 0.5 to 1.9 m$^2$/g. A battery of stable higher performance can be provided by using, in the positive electrode of the lithium-ion secondary battery 100, hollow-structure positive electrode active materials 610a, 610b that satisfy the above BET specific surface area. For instance, it becomes possible to construct a lithium secondary battery having low internal resistance (in other words, having good output characteristic) and exhibiting little rise in resistance even upon charge and discharge cycling (in particular, charge and discharge cycles that include discharge at a high rate).

If the BET specific surface area of the active material particles is too small, the effect of enhancing battery performance (for instance, the effect of reducing internal resistance) is likely to become weaker. On the other hand, if the BET specific surface area is too large, the effect of suppressing deterioration caused by charge and discharge cycles tends to weaken. By virtue of the positive electrode active materials 610a, 610b of hollow structure that satisfy the preferred BET specific surface area disclosed herein, it becomes possible to simultaneously enhance the high-rate characteristic (for instance, to elicit at least one effect from among curtailment of resistance increase on account of high-rate cycling, such as the below-described high-rate cycle test, and enhancement of the high-rate discharge performance, among others), and preventing wear deterioration (for instance, to elicit at least one effect from among curtailment of the resistance increase for durability cycling, such as the below-described durability test, and enhancement of the capacity retention rate, among others).

The average hardness of the positive electrode active materials 610a, 610b of hollow structure may be, for instance, 0.5 MPa or higher in a dynamic hardness measurement performed under conditions of a loading rate ranging from 0.5 mN/s to 3 mN/s using a flat diamond indenter having a diameter of 50 μm.

In another preferred embodiment of the active material particles disclosed herein, the average hardness of the positive electrode active materials 610a, 610b of hollow structure is about 0.5 MPa or higher. Herein, the average hardness of the positive electrode active materials 610a, 610b of hollow structure denotes a value obtained in a dynamic hardness measurement performed under conditions of loading rate ranging from 0.5 mN/s to 3 mN is using a flat diamond indenter having a diameter of 50 μm. Active material particles having thus a hollow structure and high average hardness (in other words, having high shape retention) afford a battery that delivers higher performance stably. As a result, this can contribute to constructing a lithium secondary battery having low internal resistance (in other words, having good output characteristic) and exhibiting little rise in resistance even upon charge and discharge cycling (in particular, charge and discharge cycles that include discharge at a high rate).

The positive electrode active materials 610a, 610b of hollow structure may be a lithium-transition metal oxide of layered structure including nickel as a constituent element. The positive electrode active materials 610a, 610b of hollow structure may be a lithium-transition metal oxide of layered structure including nickel, cobalt and manganese as constituent elements.

For instance, the average particle size of the positive electrode active materials 610a, 610b of hollow structure ranges preferably from about 3 μm to 10 μm. The average opening size of the through-holes 930 of the positive electrode active material 610b of perforated hollow structure is preferably ½ or less of the average particle size of the positive electrode active material 610b. The average opening size of such positive electrode active material 610b lies within an appropriate range, and hence it becomes possible to easily secure a desired hardness while appropriately eliciting the effect of enhancing battery performance (for instance, the effect of reducing internal resistance), thanks to the perforated hollow structure. Therefore, good battery performance can be delivered yet more stably.

An appropriate example of the positive electrode active material has been explained as the positive electrode active material comprised in the positive electrode mixture layer 223 of the lithium-ion secondary battery 100, but the positive electrode active material of the lithium-ion secondary battery 100 according to the present invention is not particularly limited thereto. The positive electrode active material is not limited to the above-described one, and porous secondary particles having small voids in the interior and that result from granulating primary particles by spray drying may be used as the positive electrode active material.

<Method for Producing the Lithium-Ion Secondary Battery>

The method for producing the lithium-ion secondary battery comprises an application step of applying a positive electrode mixture onto a collector; a drying step of drying the positive electrode mixture applied onto the collector: and a rolling step of rolling a positive electrode mixture layer that has been dried in the drying step. The positive electrode mixture contains a positive electrode active material and a conductive material. The positive electrode mixture that is applied in the application step may be adjusted in such a manner that the mass ratio $\alpha$ of the positive electrode active material in the positive electrode mixture layer is $0.84 \leq \alpha \leq 0.925$, the mass ratio $\beta$ of the conductive material in the positive electrode mixture layer is $0.06 \leq \beta \leq 0.12$, and the index Y worked out from the expression below is 30 (mL/100 mL/g)$\leq Y \leq$89 (mL/100 g). The application step, the drying step and the rolling step may be adjusted in such a manner that the index Y worked out based on the expression above is 30 (mL/100 g)$\leq Y \leq$89 (mL/100 g), and the porosity X of the positive electrode mixture layer formed after the rolling step is 30(%)$\leq X \leq$65(%).

<Evaluation Method of the Lithium-Ion Secondary Battery>

The porosity X of the positive electrode mixture layer 223 and the index Y worked out based on the expression above may be used as evaluation indices in an evaluation method for evaluating the performance of the lithium-ion secondary battery 100 (FIG. 1) that comprises a positive electrode in which the positive electrode collector 221 is coated with the positive electrode mixture layer 223 made up of a positive electrode active material and a conductive material.

That is, the porosity X is used as an index for evaluating the amount of electrolyte solution that impregnates the interior of the positive electrode mixture layer 223, and the index Y is used as an index for evaluating the degree to which the electrolyte solution that impregnates the positive electrode mixture layer 223 is absorbed by the positive electrode active material and the conductive material. For instance, it is possible to evaluate whether the positive electrode mixture layer 223 that is formed allows enhancing the performance of the lithium-ion secondary battery 100, depending on whether the porosity X of the positive electrode mixture layer is 30(%) $\leq X \leq$65(%), and the index Y is 30 (mL/100 g)$\leq Y \leq$89 (mL/100 g).

An appropriate example of the positive electrode active material has been explained as the positive electrode active material comprised in the positive electrode mixture layer of the lithium-ion secondary battery, but the positive electrode active material of the secondary battery according to the present invention is not particularly limited thereto, unless specifically indicated otherwise.

Figure 11:
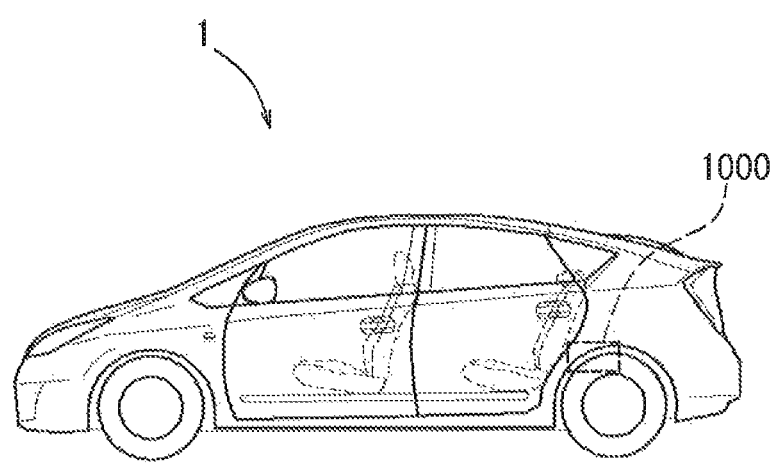
FIG. 11 is a diagram illustrating one example of a vehicle equipped with a battery for vehicle drive.

The present invention can contribute to enhancing the output of a secondary battery. Accordingly, the structure according to the present invention can be appropriately used in a secondary battery for vehicle driving power sources, such as a battery for driving a hybrid car or an electric automobile, that is required to exhibit a particularly high level of output characteristic and cycle characteristic at a high rate. In this case, the battery can be appropriately used as a battery for vehicle drive 1000, as illustrated in FIG. 11, in the form of a battery pack resulting from combining a plurality of secondary batteries connected to each other, for driving the motor (electric motor) of a vehicle 1 such as an automobile or the like.

Specifically, the positive electrode active material 610 that is used in the positive electrode mixture layer 223 of the battery for vehicle drive 1000 may have the above-described secondary particles 910, hollow section 920 and through-hole 930, as illustrated in FIG. 6. The shape of the battery and the detailed structure of the battery can accommodate all manner of variations. The battery for vehicle drive 1000 may be in the form of a battery pack that combines a plurality of secondary batteries.

The present invention proposes a structure of a positive electrode mixture layer that allows enhancing the output of a secondary battery that has a positive electrode wherein collector is coated with a positive electrode mixture layer. The present invention is not limited to any of the embodiments described above. For instance, a lithium-ion secondary battery has been appropriately exemplified as one embodiment of the present invention, but unless specifically indicated otherwise, the present invention is not limited to a lithium-ion secondary battery. Unless specifically stated otherwise, the secondary battery according to the present invention may be used also in structures of positive electrode mixture layers of secondary batteries other than lithium-ion secondary batteries.

REFERENCE SIGNS LIST 100 lithium-ion secondary battery (secondary battery)
200 wound electrode body
220 positive electrode sheet
221 positive electrode collector
222 uncoated section
222a intermediate portion
223 positive electrode mixture layer
224 positive electrode mixture
240 negative electrode sheet
241 negative electrode collector
242 uncoated section.
243 negative electrode mixture layer
244 negative, electrode mixture
245 heat-resistant layer
262 separator
264 separator
300 battery case
310, 312 gap
320 container main body
322 seam of 11d body and container main body
340 lid body
360 safety valve
420 electrode terminal (positive electrode)
440 electrode terminal (negative electrode)
610 positive electrode active material.
610a positive electrode active material ("hollow structure")
610b positive electrode active material ("perforated hollow structure")
620 conductive material
630 binder
800 battery for evaluation testing 810 positive electrode sheet
820 negative electrode sheet
830, 840 separator
850 wound electrode body
860 outer case
870 electrode terminal
900 primary particles
910 secondary particles
920 hollow section
930 through-hole
1000 battery for vehicle drive

The invention claimed is:

1. A secondary battery, comprising a positive electrode in which a collector is coated with a positive electrode mixture layer,
wherein the positive electrode mixture layer contains a positive electrode active material and a conductive material,
a porosity X of the positive electrode mixture layer is 30(%)≤X,
a mass ratio α of the positive electrode active material in the positive electrode mixture layer is 0.84≤α≤0.925, and a mass ratio β of the conductive material in the positive electrode mixture layer is 0.06≤β≤0.12,
the positive electrode active material is made up of secondary particles resulting from aggregation of a plurality of primary particles of a lithium-transition metal oxide,
the secondary particles each have a perforated hollow structure that has:
a hollow section; and
a through-hole that runs through the secondary particle so as to link the hollow section with an exterior, and
an index Y worked out from an expression below is 30 (mL/100 g)≤Y≤89 (mL/100 g):

$$Y = A \times \alpha + B \times \beta,$$

wherein A is a DBP absorption number (mL/100 g) of the positive electrode active material,
α is the mass ratio of the positive electrode active material in the positive electrode mixture layer,
B is a DBP absorption number (mL/100 g) of the conductive material, and
β is the mass ratio of the conductive material in the positive electrode mixture layer.

2. The secondary battery according to claim 1,
wherein the positive electrode active material is a positive electrode active material produced in accordance with a production method that includes:
a starting material hydroxide generation step of supplying ammonium ions to an aqueous solution of a transition metal compound, to cause particles of the transition metal hydroxide to precipitate from the aqueous solution, the aqueous solution containing at least one transition metal element that makes up the lithium-transition metal oxide;
a mixing step of preparing an unfired mixture by mixing the transition metal hydroxide and a lithium compound; and
a firing step of obtaining the active material particles by firing the mixture,
wherein the starting material hydroxide generation step includes a nucleation stage in which the transition metal hydroxide is caused to precipitate from the aqueous solution at pH 12 or higher and at an ammonium ion concentration of 25 g/L or lower, and a particle growth stage in which the precipitated transition metal hydroxide is caused to grow at pH lower than 12 and at an ammonium ion concentration of 3 g/L or higher.

3. The secondary battery according to claim 1, wherein a DBP absorption number A of the positive electrode active material is A>40 (mL/100 g).

4. The secondary battery according to claim 1, wherein an opening width of the through-holes is 0.01 μm or larger in average.

5. The secondary battery according to claim 1, wherein an opening width of the through-holes is 2.0 μm or smaller in average.

6. The secondary battery according to claim 1, wherein the number of the through-holes ranges, in average, from 1 to 20 per particle of the active material particles.

7. The secondary battery according to claim 2, wherein the firing step is performed in such a manner that a highest firing temperature ranges from 800° C. to 1100° C.

8. The secondary battery according to claim 7, wherein the firing step includes a first firing stage of firing the mixture at a temperature T1 ranging from 700° C. to 900° C., and a second firing stage of firing the resulting product having undergone the first firing stage, at a temperature T2 that ranges from 800° C. to 1100° C. and is higher than the firing temperature T1 in the first firing stage.

9. The secondary battery according to claim 1, wherein a BET specific surface area of the positive electrode active material ranges from 0.5 to 1.9 m$^2$/g.

10. The secondary battery according to claim 1, wherein an average hardness of the positive electrode active material is 0.5 MPa or higher in a dynamic hardness measurement performed under conditions of a loading rate ranging from 0.5 mN/s to 3 mN/s using a flat diamond indenter having a diameter of 50 μm.

11. The secondary battery according to claim 1, wherein the positive electrode active material has an average particle size ranging from 3 μm to 10 μm.

12. The secondary battery according to claim 1, wherein the positive electrode active material is a lithium-transition metal oxide of layered structure including nickel as a constituent element.

13. The secondary battery according to claim 1, wherein the positive electrode active material is a lithium-transition metal oxide of layered structure including nickel, cobalt and manganese as constituent elements.

14. The secondary battery according to claim 1, wherein a porosity X of the positive electrode mixture layer is X≤65(%).

15. A battery for vehicle drive, comprising the secondary battery according to claim 1.

16. A method for producing a secondary battery, comprising:
an application step of applying a positive electrode mixture onto a collector;
a drying step of drying the positive electrode mixture applied onto the collector; and
a rolling step of rolling a positive electrode mixture layer that has been dried in the drying step,
wherein the positive electrode mixture contains a positive electrode active material and a conductive material,
the positive electrode active material is made up of secondary particles resulting from aggregation of a plurality of primary particles of a lithium-transition metal oxide,
the secondary particles each have a perforated hollow structure that has:
a hollow section; and
a through-hole that runs through the secondary particle so as to link the hollow section with an exterior,
the positive electrode mixture that is applied in the application step is adjusted in such a manner that a mass ratio α of the positive electrode active material in the positive electrode mixture layer is $0.84 \leq \alpha \leq 0.925$, a mass ratio $\beta$ of the conductive material in the positive electrode mixture layer is $0.06 \leq \beta \leq 0.12$, and an index Y worked out from an expression below is $30\ (mL/100\ g) \leq Y \leq 89\ (mL/100\ g)$, and the application step, the drying step and the rolling step are adjusted in such a manner that a porosity X of the positive electrode mixture layer formed after the rolling step is $30(\%) \leq X$:

$$Y = A \times \alpha + B \times \beta,$$

wherein A is a DBP absorption number (mL/100 g) of the positive electrode active material, $\alpha$ is the mass ratio of the positive electrode active material in the positive electrode mixture layer, B is a DBP absorption number (mL/100 g) of the conductive material, and $\beta$ is the mass ratio of the conductive material in the positive electrode mixture layer.

17. An evaluation method of a secondary battery that includes a positive electrode in which a collector is coated with a positive electrode mixture layer containing a positive electrode active material and a conductive material, the positive electrode active material is made up of secondary particles resulting from aggregation of a plurality of primary particles of a lithium-transition metal oxide, the secondary particles each have a perforated hollow structure that has:

a hollow section; and a through-hole that runs through the secondary particle so as to link the hollow section with an exterior, and the evaluation method comprising evaluating a performance of the secondary battery, relating to the positive electrode mixture layer, by using, as evaluation indices, a porosity X of the positive electrode mixture layer and an index Y worked out from an expression below:

$$Y = A \times \alpha + B \times \beta,$$

wherein A is a DBP absorption number (mL/100 g) of the positive electrode active material, $\alpha$ is a mass ratio of the positive electrode active material in the positive electrode mixture layer, B is a DBP absorption number (mL/100 g) of the conductive material, and $\beta$ is a mass ratio of the conductive material in the positive electrode mixture layer.

18. The secondary battery according to claim 1, wherein the DBP absorption number B of the conductive material is $B \leq 175\ (mL/100\ g)$.

19. The secondary battery according to claim 1, wherein the mass ratio $\beta$ of the conductive material in the positive electrode mixture layer is $0.08 \leq \beta \leq 0.12$.

* * * * *